United States Patent Office 3,325,480
Patented June 13, 1967

3,325,480
5'-SUBSTITUTED STEROIDAL PYRAZOLES OF THE PREGNANE SERIES
Pietro de Ruggieri, Carmelo Gandolfi, and Umberto Guzzi, Milan, Italy, assignors to Ormonoterapia Richter S.p.A., Milan, Italy, a corporation of Italy
No Drawing. Filed Jan. 29, 1965, Ser. No. 429,163
Claims priority, application Italy, Feb. 1, 1964,
2,245/64
23 Claims. (Cl. 260—239.5)

The present invention relates to compounds having the following general formulae

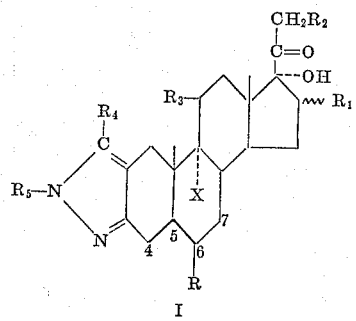

I

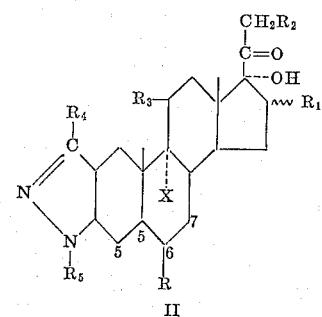

II wherein R is hydrogen, methyl, fluoro or chloro, $R_1$ is hydrogen, α-methyl, or β-methyl; $R_2$ is hydrogen, hydroxy, or acyloxy in which the acyl radical is derived from a carboxylic acid having from 1 to 10 carbon atoms; $R_3$ is hydrogen, keto, or β-hydroxy; $R_4$ is amino, alkylamino, acylamino, arylamino, hydroxy, acyloxy in which the acyl radical is derived from a carboxylic acid having from 1 to 10 carbon atoms, or lower alkoxy; $R_5$ is hydrogen, alkyl, or aryl aralkyl; X is hydrogen and or fluoro and the bonds between the 4,5 and 6,7 carbon atoms are single or double.

These compounds (I and II), which are endowed with a very high cortical and in some cases progestational activity represent the two possible tautomeric forms of N-substituted pyrazoles fused with the 2- and 3-carbon atoms of the steroidal ring A; when $R_5$ is hydrogen the two tautomeric forms I and II are well-balanced and non-separable.

A compound of Formula I is called a [3,2-c]-1',5'-substituted-pyrazole and a compound of Formula II is called a [2,3-d]-1',3'-substituted-pyrazole. Some authors, however, are inclined to keep the same denomination for the two forms and they, accordingly, also call a compound of Formula II a [3,2-c]-2',5'-substituted-pyrazole.

As starting materials for the preparation of the compounds of the invention, there may be used certain compounds described in the copending U.S. patent application Ser. No. 428,863, filed Jan. 28, 1965, and certain others prepared as described in the present application.

In order to protect unstable or particularly reactive groups in the 17β side-chain characteristic of the corticalsteroids, there may be employed easily eliminated 20,20-ethylendioxy and 17,20,20,21-bismethylendioxy groups as shown by the following formulae:

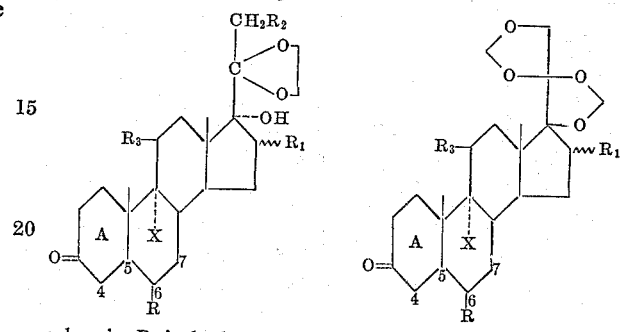

wherein R is hydrogen, methyl, fluoro or chloro; $R_1$ is hydrogen, α-methyl, or β-methyl; $R_2$ is hydrogen or hydroxy; $R_3$ is hydrogen, keto, or β-hydroxy; X is hydrogen, or fluoro and the bonds between the 4,5- and 6,7-carbon atoms are single or double.

The synthesis as applied only to ring A may be illustrated as follows in accordance with two general schemes of reaction:

Scheme I

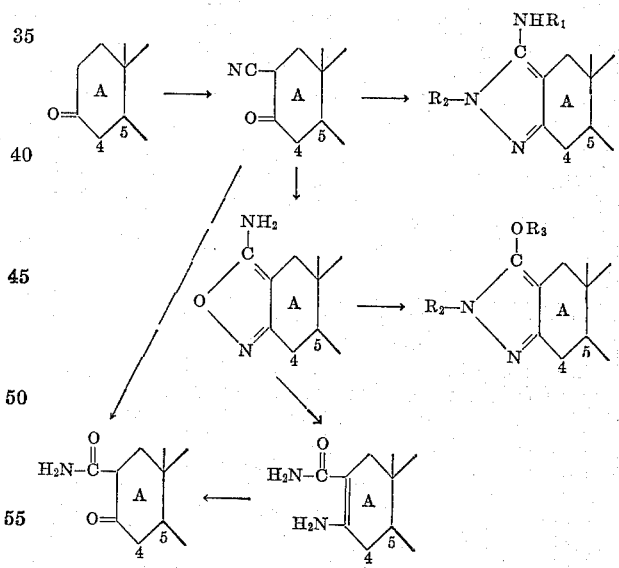

wherein $R_1$ is hydrogen, alkyl, aryl, or acyl; $R_2$ is hydrogen, alkyl, aryl, or aralkyl; $R_3$ is alkyl or acyl and the bond between the 4- and 5-carbon atoms is single or double, the alkyl groups being lower alkyl and the acyl radicals being derived from a carboxylic acid of from 1 to 10 carbon atoms.

Another scheme of synthesis is the following:

Scheme II

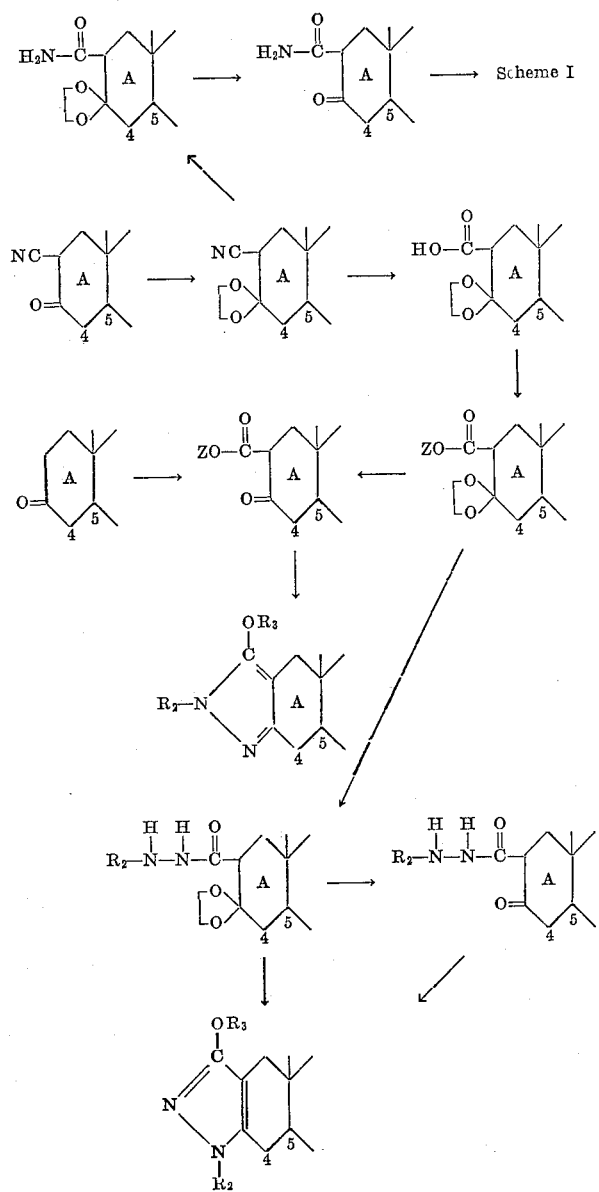

wherein Z is alkyl; $R_2$ is hydrogen, alkyl, aryl, or aralkyl; $R_3$ is alkyl or acyl and the bond between the 4- and 5-carbon atoms is single or double, the alkyl groups being lower alkyl and the acyl groups being derived from a carboxylic acid of from 1 to 10 carbon atoms.

In accordance with scheme I, a 2α-cyano-3-keto-derivative, obtained as described in application Ser. No. 428,863 and reacted with hydrazine, or with N-substituted hydrazines yields a 5'-amino-[3,2-c]-1'-substituted or unsubstituted pyrazole, which then reacted with hydroxylamine, again as described in our copending application Ser. No. 428,863 yields a 5'-amino-[3,2-c]-isoxazole, which treated with hydrazine or with N-substituted hydrazine gives 5'-hydroxy-[3,2-c]-1'-substituted or unsubstituted pyrazole (Formula I). The same 5'-amino-[3,2-c]-isoxazole, treated with platinum or palladium under hydrogen atmosphere, yields a 2-acetamido-3-amino and then a 2-acetamido-3-keto-derivative (which can also be obtained through a mild saponification of a 2α-cyano-3-keto derivative with potassium carbonate in ethanol) and either of these derivatives, when treated with 5'-hydroxy-[3,2-c]-1'-substituted- or unsubstituted-pyrazoles (Formula I).

In accordance with scheme II, a 2α-cyano-3-keto-derivative with the 3-keto group converted to a 3,3-ethylendioxy group is hydrolyzed to a 2-carboxyamido derivative (Scheme I) under mild conditions or to a 2-carboxy-3,3-ethylendioxy derivative under strong conditions, and then to a 2-carboethoxy-3,3-ethylendioxy derivative.

The last named compound, treated with hydrazine or N-substituted corresponding hydrazine yields the hydrazides, which is then cyclized, through elimination of the ketal group, to a 5'-hydroxy-[2,3-d]-1'-substituted-pyrazole (5'-hydroxy-[3,2-c]-2'-substituted - pyrazole) (Formula II). Through hydrolysis of the 2-carboethoxy-3,3-ethylendioxy derivative we obtain a 2-carboethoxy-3-keto-derivative, which can also be obtained directly from the parent 3-keto compound through treatment with diethylcarbonate and potassium t-butoxide in dimethylsulfoxide.

From the 2-carboethoxy-3-keto - derivative, through treatment with hydrazine or an N-substituted hydrazine, we obtain the 5'-hydroxy-[3,2-c]-1'-substituted or unsubstituted-pyrazoles (Formula I), which we had already obtained by the other method.

The 5'-acyl, alkyl, and arylamino-[3,2-c]-pyrazoles and the 5-alkoxy and acyloxy-[3,2-c]- and 3'-alkoxy and acyloxy-[2,3-d]-pyrazoles have also been prepared.

Among the monosubstituted hydrazines which may be used for carrying out the process of our invention are alkylhydrazines, such as methylhydrazine, ethylhydrazine, propylhydrazines, butylhydrazines, β - hydroxyethylhydrazine, and cycloalkylhydrazines; arylhydrazines including phenylhydrazine and the substituted phenylhydrazines, such as o-, m-, and p-halophenylhydrazines, o-, m-, and p-tolylhydrazines, o-, m-, and p-alkoxyphenylhydrazines, o-, m-, and p-nitrophenylhydrazines, 1-hydrazinonaphthalene, 2-hydrazinopyridine, 3-hydrazinopyridine, 4 - hydrazinopyridine, 4-hydrazinopyridineoxide and 2-hydrazinopyrimidine; and aralkylhydrazines, such as benzylhydrazine and phenylethylenehydrazine.

Several of the intermediates formed in the process of the invention are new and are claimed in this application.

The following examples are set forth as illustrating, but not as limiting this invention.

Example 1

To a suspension of 20 g. of 17α,20,20,21-bis(methylendioxy)-11β-hydroxy-2α-cyano-6α-methyl-4-pregnene - 3- one in toluene are added under reflux and stirring, 25 ml. of ethylene glycol and 2 g. of p-toluenesufonic acid. The reaction proceeds with elimination of water for 8 hrs. The mixture is cooled, washed with a 10% solution of sodium carbonate and then dried. The solvent is evaporated in vacuo and the residue, crystallized from ethanol, yields 17α,20,20,21-bis(methylendioxy)-11β-hydroxy-2α - cyano-6α-methyl-5-pregnene-3,3-ethylendioxy.

3 g. of 17α,20,20,21-bis(methylendioxy)-11β-hydroxy-2α-cyano-6α-methyl-5-pregnene-3,3-ethylendioxy are dissolved in 30 ml. of ethylene glycol and 15 ml. of a 40% solution of potassium hydroxide are added. The system is refluxed with stirring. After 20 hrs. the cooled reaction mixture is diluted with a saturated aqueous solution of sodium dihydrogen phosphate and the material which separates is recovered by filtration and washed until neutral. Crystallization from methanol yields 17α,20,20,21 - bis (methylendioxy)-11β-hydroxy-2α-carboxy-6α-methyl - 5-pregnene-3,3-ethylendioxy.

A solution of 500 mg. of the above product is dissolved in 5 ml. of methanol and heated with an excess of diazomethane. When the development of nitrogen stops, the system is taken to dryness to give a crystalline residue. Recrystallization from methanol yields 17α,20,20,21 - bis (methylendioxy)-11β-hydroxy - 2α - carbomethoxy - 6α-methyl-5-pregnene-3,3-ethylendioxy.

200 mg. of the above compound are dissolved in methanol and refluxed for 15 minutes with 15 ml. of 4 N hydrochloric acid. The reaction solution is cooled to room temperature, neutralized with a saturated solution of sodium carbonate and diluted with water and the material which separates is recovered by filtration. Recrystallization from ethy acetate yields 17α,20,20,21-bis(methylendioxy)-11β-hydroxy-2α-carbomethoxy-6α-methyl-4 - pregnene-3-one.

A solution of 0.001 mole of 17α,20,20,21-bis(methylendioxy)-11β-hydroxy-2-carboxy-6α-methyl-5-pregnene-3,3-ethylendioxy is dissolved in 20 ml. of dry dioxane and treated with a solution of 0.0011 mole of sodium methoxide in methanol. The mixture is continuously stirred for 15 minutes, and then the solvent is distilled at about 30° C. in vacuo to give the sodium salt of 17α,20,20,21-bis (methylendioxy)-11β-hydroxy-2-carboxy-6α-methyl - 11β-hydroxy-5-pregnene-3,3-ethylendioxy.

The above compound is suspended in benzene and treated with 5 ml. of oxalyl chloride at 0° C. for 15 minutes. After this time all the product is dissolved and the solution is then taken to dryness at about 20° C. under vacuum to yield 17α,20,20,21-bis(methylendioxy)-11β - hydroxy-2α-carboxy-chloride-6α-methyl-5 - pregnene - 3,3-ethylendioxy.

A solution of the above product in anhydrous benzene is added dropwise during one hour to benzene on a water bath, while passing a stream of $NH_3$ through it, the $NH_3$ stream being continued for 20 minutes after the addition is complete. The solution is washed with water and evaporated to dryness to give 17α,20,20,21 - bis(methylendioxy)-11β-hydroxy-2α-carboxy-amide-6α - methyl - 5-pregnene-3,3-ethylendioxy.

A 200 mg. aliquot of the above compound is dissolved in pure methanol and refluxed for 15 minutes with 5 ml. of hydrochloric acid (4 N). The reaction solution is cooled, neutralized and diluted with water. The material which separates is recovered by filtration. The product upon crystallization yields 17α,20,20,21 - bis(methylendioxy)-11β-hydroxy-2α-carboxyamide-6α-methyl-4-pregnene - 3-one.

500 mg. of 17α,20,20,21-bis(methylendioxy)-11β-hydroxy-2α-carboxy-chloride-6α-methyl - 5 - pregnene - 3,3-ethylendioxy are dissolved in 15 ml. of benzene and heated with 300 mg. of phenylhydrazine. The resulting mixture is heated at reflux temperature for a period of 2 hrs. The reaction solution, washed with water, is then dried and taken to dryness. The residue is crystallized from methanol to give 17α,20,20,21-bis(methylendioxy)-11β-hydroxy-2α-carboxy-phenyl-hydrazide-6α-methyl - 5 - pregnene - 3,3-ethylendioxy. The above product is also obtained in the same manner starting from 17α,20,20,21-bis(methylendioxy)-11β-hydroxy-2α-carboxy-amide - 6α - methyl-5-pregnene-3,3-ethylendioxy and 17α,20,20,21-bis(methylendioxy)-11β-hydroxy-2α-carbomethoxy - 6α - methyl-5-pregnene-3,3-ethylendioxy.

500 mg. of 17α,20,20,21-bis(methylendioxy)-11β-hydroxy-2α-carboxy-phenyl - hydrazide - 6α - methyl - 5-pregnene-3,3-ethylendioxy is dissolved in 5 ml. of ethanol and heated with 2 ml. of 4 N hydrochloric acid. The mixture is refluxed for 1 hr., cooled to room temperature and neutralized with a 5% solution of sodium carbonate. The mixture is diluted with water and the material which precipitates is recovered by filtration, washed with water and dried to give 17α,20,20,21-bis(methylendioxy)-11β-hydroxy-6α-methyl-4-pregnene-[2,3-d] - pyrazole-1'-phenyl-3'-hydroxy.

To a solution of 300 mg. of the above compound dissolved in 30 ml. of tert-butyl alcohol are added 400 mg. of chloranil. After 6 hrs. at reflux temperature, the system is taken to dryness and chromatographed over alumina to give after crystallization from methanol, 17α,20,20,21-bis(methylendioxy)-11β-hydroxy - 6α - methyl-4,6-pregnadiene-[2,3-d]-pyrazole-1'-phenyl-3'-hydroxy.

500 mg. of 17α,20,20,21-bis(methylendioxy)-11β-hydroxy-4-pregnene-[2,3-d] - pyrazole-1'-phenyl-3'-hydroxy are heated on a steam bath with 25 ml. of a 60% aqueous solution of formic acid for about 30 minutes. The excess reagent is removed in vacuo and after dissolving in pyridine, the produce is precipitated with water and filtered to give an amorphous solid which is a mixture of 11β,17α,21 - trihydroxy - 6α - methyl-20-oxo-4-pregneno-[2,3-d]-pyrazole-1'-phenyl-3'-formyloxy and 21-formyloxy-11β,17α-dihydroxy-6α-methyl-20-oxo - 4 - pregnene-[2,3-d]-pyrazole-1'-phenyl-3'-formyloxy. The two compounds were separated on silica gel.

500 mg. of this crude product is dissolved in 2.5 ml. of pure methanol and allowed to react with a solution of 1.35 N sodium methoxide in methanol for 10 minutes at room temperature under a nitrogen atmosphere. The alkoxide is neutralized with acetic acid and the mixture is then taken to dryness. The residue is washed with water, filtered and dried. Crystallization from ethyl acetate gives 11β,17α,-21-trihydroxy-6α-methyl-20-oxo - 4 - pregneno-[2,3-d]-pyrazole-1'-phenyl-3'-hydroxy.

1 g. of 17α,20,20,21-bis(methylendioxy)-2α-carbomethoxy-6α-methyl-11β-hydroxy-4-pregnene-3-one is dissolved in 200 ml. of absolute ethanol and treated with an excess of phenyl hydrazine (2 ml.). The mixture is refluxed in a nitrogen atmosphere for about 2 hrs. and then evaporated to dryness under reduced pressure. The reaction residue is diluted with ethyl acetate and washed two times with 2 N sulphuric acid, two times with 2 N sodium hydroxide and then with water. The ethyl acetate extract is then dried, concentrated an chromatographed on silica gel. Elution with benzene-ether yields 17α,20,20,21-bis(methylendioxy) - 11β - hydroxy - 6α-methyl-4-pregneno-[3,2-c] - pyrazole - 1' - phenyl - 5'-hydroxy.

In accordance with the above procedure, but starting with 17α,20,20,21-bis(methylendioxy)2α-carboxy-amide-11β-hydroxy-6α-methyl-4-pregnene-3-one, we obtain the same product.

A 500 mg. aliquot of 17α,20,20,21-bis(methylendioxy)-11β-hydroxy-6α-methyl-4-pregneno-[3,2-c] - pyrazole - 1'-phenyl-5'-hydroxy is heated on a steam bath with 60 ml. of 60% formic acid for 20 minutes. The solvents are removed in vacuo, water is added and the product is filtered to give a mixture of 11β,17α,21-trihydroxy-6α-methyl-4-pregnene-20-one-[3,2-c]-pyrazole-1'-phenyl - 5' - hydroxy and its 21-formate.

A 500 mg. aliquot of this crude product is dissolved in 2.5 ml. of pure methanol and allowed to react with 0.9 ml. of 1.35 N solution of sodium methoxide in methanol at room temperature under a nitrogen atmosphere for 10 minutes. The alkoxide is neutralized with acetic acid. The mixture is then taken to dryness. The residue is washed with water, filtered and dried to yield, after crystallization from ethyl acetate, 11β,17α,20-trihydroxy-6α-methyl-20-one-4-pregneno-[3,2-c]-pyrazole - 1' - phenyl-5'-hydroxy.

In accordance with the above procedure all the compounds above obtained are treated in the same manner for the removal of the bis(methylendioxy) group.

1.320 g. of 17α,20,20,21-bis(methylendioxy)-11β-hydroxy-6α-methyl-4-pregneno-[3,2-c]-isoxazole - 5' - amino are dissolved in 150 ml. of ethanol and treated with a mixture of 1.302 g. of phenylhydrazine hydrochloride and 1.224 g. of sodium acetate with 3 molecules of water dissolved in 9 ml. of water of crystallization. The solution is refluxed for 4 hrs. The mixture is then taken to dryness and chromatographed on silica gel. Elution with a mixture of 90:160 ether:petroleum ether and crystallization from ether yields 17α,20,20,21-bis(methylendioxy)-11β-hydroxy-6α-methyl - 4 - pregneno - [3,2-c]-pyrazole-1'-phenyl - 5' - hydroxy and 17α,20,20,21 - bis(methylendioxy)-2α-carboxyamide.

500 mg. of 17α,20,20,21-bis(methylendioxy)-11β-hydroxy-6α-methyl-4-pregneno - [3,2-c] - pyrazole - 5' - hydroxy dissolved in 20 ml. of methanol-methylene chloride (1:1 v./v.) are treated with an excess of an ethereal solution of diazomethane. After a violent development of nitrogen the reaction is maintained under constant stirring for one hour.

The excess reagent and part of the solvent are removed in vacuo using a water bath as the source of heat. During concentration the product crystallizes to give 17α,20,20,21-bis(methylendioxy)-11β-hydroxy - 6α - methyl-4-pregneno-[3,2-c]-pyrazole-5'-methoxy.

In accordance with the above procedure but using this time an excess of diazoethane there are obtained the corresponding 5'-ethoxy-derivatives.

500 mg. of 17α,20,20,21-bis(methylendioxy)-11β-hydroxy-6α-methyl - 4 - pregneno-[2,3-d]-pyrazole-3'-hydroxy are dissolved in pyridine (4 ml.) and treated with acetic anhydride (2 ml.) overnight at room temperature, a mixture of ice and water is then added and the material which separates is recovered by filtration. The product is washed with water and dried to yield 17α,20,20,21-bis-(methylendioxy)-11β-hydroxy-6α-methyl - 4 - pregneno-[2,3-d]-pyrazole-1'-phenyl-3'-acetoxy.

A 500 mg. aliquot of the above compound is dissolved in 10 ml. of 80% (v./v.) acetic acid and heated on a steam bath for 30 minutes. The solution is diluted with 40 ml. of water and extracted with ethyl acetate. The ethyl acetate extract is washed with water and with a saturated solution of sodium bicarbonate, dried and evaporated to dryness in vacuo to give a mixture of 11β,17α,21-trihydroxy-6α-methyl - 4 - pregneno-20-one-[2,3-d]-pyrazole-1'-phenyl-3'-acetoxy-21-acetate and 11β,17α,21-trihydroxy-6α-methyl - 4 - pregneno-20-one-[2,3-d]-pyrazole-1'-phenyl-3'-acetoxy. These compounds are separated by chromatography on silica gel.

The 17α,20,20,21-bis(methylendioxy) - 2α - cyano-11β-hydroxy-6α-methyl-4-pregnene-3-one (1 g.) is dissolved in 20 ml. of pyridine, and heated with 1 g. of phenylhydrazine hydrochloride. The mixture is refluxed for ½ hr. under a nitrogen atmosphere and then evaporated to dryness. The residue is diluted with ethyl acetate and washed with water, two times with 1 N sulphuric acid and two times with a solution of 2 N sodium hydroxide. The ethyl acetate extract is dried and then taken to dryness. Recrystallization of the resulting product yields 17α,20,20,21-bis(methylendioxy)-11β-hydroxy - 6α - methyl-4-pregneno-[3,2-c]-pyrazole-1'-phenyl-5'-amino.

A solution of 1 g. of 17α,20,20,21-bis(methylendioxy)-11β-hydroxy - 6α - methyl-4-pregneno-[3,2-c]-pyrazole-1'-phenyl-5'-amino is dissolved in methanol and treated over night with 1 ml. of benzaldehyde while stirring. The material which separates during this time is recovered by filtration, washed with methanol and dried to give 17α,20,20,21-bis(methylendioxy)-11β-hydroxy - 6α - methyl-4-pregneno-[3,2-c]-pyrazole - 1' - phenyl-5'-N-benzylidene-amino.

In accordance with the above procedure, but using an equivalent quantity of acetaldehyde in place of benzaldehyde there is obtained the corresponding 5'-N-ethylidene-amino derivative.

In accordance with the above procedures, but starting with a pyrazole, where the bis-methylendioxy group is removed, we obtain the corresponding 5'-N-benzylidene-amino and 5'-N-ethylidene-amino derivatives.

A solution of 500 mg. of 17α,20,20,21-bis(methylendioxy)-11β-hydroxy - 6α - methyl-4-pregneno-[3,2-c]-pyrazole-1'-phenyl-5'-N-benzylidene-amino in 15 ml. of tetrahydrofuran is heated with a suspension of 200 mg. of lithium aluminum hydride in 10 ml. of tetrahydrofuran. The mixture is refluxed with stirring for one hour. The excess reagent is destroyed with ethyl acetate and this solution, diluted with ethyl acetate, is washed two times with a dilute solution of hydrochloric acid, 3 times with a 10% solution of sodium bicarbonate and then to neutrality with water. The ethyl acetate extract is dried and evaporated in vacuo. The crystallization of the resulting product yields 17α,20,20,21-bis(methylendioxy)-11β-hydroxy-6α-methyl - 4 - pregneno-[3,2-d]-pyrazole-1'-phenyl-5'-N-benzyl-amino.

In accordance with the above procedure, but starting with 17α,20,20,21-bis(methylendioxy) - 11β - hydroxy - 6α-methyl-4-pregneno-[3,2-c]-pyrazole - 1' - phenyl-5'-N-ethylidene-amino, there is obtained 17α,20,20,21-bis-(methylendioxy)-11β-hydroxy - 6α - methyl-4-pregneno-[3,2-c]-pyrazole-1'-phenyl-5'-N-ethyl-amino.

A solution of 1.5 g. of 17α,20,20,21-bis(methylendioxy)-11β-hydroxy-6α-methyl - 4 - pregneno-[3,2-c]-pyrazole-1'-phenyl-5'-N-ethyl is dissolved in 30 ml. of 80% (v./v.) acetic acid and refluxed for one hour. The solution is diluted with ice-water (100 ml.) and extracted with ethyl acetate. The ethyl acetate extracts are washed with water and with a saturated solution of sodium bicarbonate, dried and evaporated to dryness in vacuo. Crystallization of the resulting product yields 11β,17α,21-trihydroxy-6α-methyl - 4 - pregneno-20-one-[3,2-c]-pyrazole-1'-phenyl-5'-N-ethyl-amino-21-acetate.

A 750 mg. aliquot of this product is dissolved in methanol (15 ml.) and allowed to react with 1.5 ml. of a 1.25 N solution of sodium methoxide in methanol at room temperature under nitrogen atmosphere for 10 minutes. The alkoxide is neutralized with acetic acid and the mixture is then taken to dryness. The residue is washed with water, filtered and dried to give an amorphous solid, whose crystallization yields 11β,17α,21-trihydroxy-6α-methyl-4-pregneno-20-one-[3,2-c]-pyrazole - 1' - phenyl-5'-N-ethyl-amino.

500 mg. of 11β,17α,20-trihydroxy-6α-methyl-20-oxo-4-pregneno-[3,2-c]-pyrazole - 1' - ethyl-5'-N-benzylidene-amino are dissolved in 4 ml. of pyridine and heated overnight with 2 ml. of acetic anhydride. After dilution with ice-water, the material which separates is recovered by filtration. Crystallization from methanol yields 11β,17α,21-trihydroxy-6α-methyl - 4 - pregneno-20-one-[3,2-c]-pyrazole-1'-ethyl-5'-N-benzylidene amino-21-acetate.

In accordance with the above procedure, but using an equivalent quantity of another acylating agent in place of acetic anhydride there is obtained the corresponding 21-acyloxy-derivative.

A 250 mg. aliquot of 11β,17α,21-trihydroxy-6α,-methyl - 4 - pregneno-20-one-[3,2-c]-pyrazole-1'-ethyl-5'-N-benzylidene-amino-21-acetate in acetone is treated with a solution of hydrochloric acid (4 N) for 30 minutes at room temperature and the material which separates is recovered by filtration and dried over phosphorous pentoxide under vacuum to give 21-acetoxy-11β,17α-trihydroxy-6α-methyl - 4-pregneno-20-one-[3,2-c]-pyrazole-1'-ethyl-5'-aminohydrochloride. Neutralization with triethylyamine gives 11β,17α,21-trihydroxy-6α-methyl - 4 - pregneno-20-one-[3,2-c]-pyrazole-1'-ethyl-5'-amino-21-acetate.

A soltion of 500 mg. of the above compound in 20 ml. of acetone is treated at 0° C. with stirring with 0.75 ml. of chromic acid and after 6 minutes, 2 ml. of isopropyl alcohol are added to destroy the excess of the oxidant. The resulting green solution is diluted with water and the precipitate which forms is recovered by filtration, washed with water and dried to give 17α,21-dihydroxy-6α-methyl-11,20-dione-4-pregneno-[3,2 - c] - pyrazole - 1' - ethyl-5-'amino-21-acetate.

In accordance with the above procedures, but using the corresponding starting materials, there are obtained as products, the [3,2-c]-pyrazole-1'-N-substituted-5'-amino-21 - acetate and [3,2-c]-pyrazole-5'-amino-21-acetate derivatives.

A solution of 500 mg. of 11β,17α,20-trihydroxy - 6α-methyl - 4 - pregneno-20-one-[3,2-c]-pyrazole-1'-phenyl-5'-amino in 4 mg. of pyridine is treated with 2 ml. of acetic anhydride.

The mixture is allowed to stand overnight at room temperature. A mixture of ice and water is then added and 11β,17α-dihydroxy - 6α-methyl - 4 - pregneno - 20 - one-[3,2-c]-pyrazole-1'-phenyl-5'-acetamido-21-acetate is isolated by filtration.

In accordance with the above procedure, but using another acylating agent in place of acetic anhydride, there is obtained the corresponding [3,2-c]-pyrazole-1'-phenyl-5'-acetamido-21-acyloxy derivative.

A 250 mg. aliquot of 11β,17α-dihydroxy-6α-methyl-4-pregnene-20-one - [3,2 - c] - pyrazole-1'-phenyl-5'-acetamido-21 acetate is dissolved in 10 ml. of methanol and alloyed to react with 0.5 ml. of 1.35 N solution of sodium methoxide in methanol at room temperature and under nitrogen atmosphere for 10 minutes. The reaction solution is neutralized with acetic acid and then the mixture is taken to dryness. The residue is washed with water, filtered and dried and after crystallization, there is obtained 11β,17α,21-trihydroxy-6α-methyl - 4 - pregnene - 20-one-[3,2-c]-pyrazole-1'-phenyl-5'-acetamido.

In accordance with the above procedures but starting with the corresponding derivatives, there are obtained as products the following pyrazoles of the 4,6-pregnadiene and 4-pregnene series:

[2,3-d]-pyrazole-1'-N-substituted-3'-hydroxy
[3,2-c]-pyrazole-1'-N-substituted-5'-hydroxy
[3,2-c]-pyrazole-1'-N-substituted-5'-methoxy, 5'-ethoxy and their 21-acetates
[2,3-d]-pyrazole-1'-N-substituted-3'-methoxy, 3'-ethoxy and their 21-acetates
[3,2-c]-pyrazole-1'-N-substituted-5'-acetoxy
[3,2-c]-pyrazole-1'-N-substituted-5'-acetoxy-21-acetate
[2,3-d]-pyrazole-1'-N-substituted-3'-acetoxy
[2,3-d]-pyrazole-1'-N-substituted-3'-acetoxy-21-acetate
[3,2-c]-pyrazole-1'-N-substituted-5'-amino and its 21-acetate
[3,2-c]-pyrazole-1'-N-substituted-5'-N-benzylidene-amino and its 21-acetate
[3,2-c]-pyrazole-1'-N-substituted-5'-N-ethylidene-amino and its 21-acetate
[3,2-c]-pyrazole-1'-N-substituted-5'-N-benzyl-amino and its 21-acetate
[3,2-c]-pyrazole-1'-N,N-substituted-5'-ethyl-amino and its 21-acetate
[3,2-c]-pyrazole-1'-N-substituted-5'-acylamido and its 21-acetate of the following compounds:

11β,17α,21-trihydroxy-4-pregnene-20-one
11β,17α,21-trihydroxy-4-pregnene-20-one-21-acetate
11β,17α,21-trihydroxy-4-pregnene-6α-methyl-9α-fluoro-20-one
11β,17α,21-trihydroxy-4-pregnene-6α-methyl-9α-fluoro-20-one-21-acetate
11β,17α,21-trihydroxy-4-pregnene-6α,16α-dimethyl-9α-fluoro-20-one
11β,17α,21-trihydroxy-4-pregnene-6α,16α-dimethyl-9α-fluoro-20-one-21-acetate
11β,17α,21-trihydroxy-4-pregnene-16β-methyl-9α-fluoro-20-one
11β,17α,21-trihydroxy-4-pregnene-16β-methyl-9α-fluoro-20-one-21-acetate
11β,17α,21-trihydroxy-4-pregnene-16α-methyl-9α-fluoro-20-one
11β,17α,21-trihydroxy-4-pregnene-16α-methyl-9α-fluoro-20-one-21-acetate
11β,17α,21-trihydroxy-4-pregnene-6α-methyl-16α-methyl-9α-fluoro-20-one
11β,17α,21-trihydroxy-4-pregnene-6α-methyl-16α-methyl-9-fluoro-20-one-21-acetate
17α,21-dihydroxy-4-pregnene-16β-methyl-9α-fluoro-11,20-dione
17α,21-dihydroxy-4-pregnene-16β-methyl-9α-fluoro-11,20-dione-21-acetate
17α,21-dihydroxy-4-pregnene-20-one
17α,21-dihydroxy-4-pregnene-20-one-21-acetate
17α,21-dihydroxy-4-pregnene-16β-methyl-20-one-21-acetate
17α,21-dihydroxy-4-pregnene-16β-methyl-20-one
17α,21-dihydroxy-4-pregnene-16α-methyl-20-one
17α,21-dihydroxy-4-pregnene-16α-methyl-20-one-21-acetate
17α,21-dihydroxy-4-pregnene-6α-methyl-20-one
17α,21-dihydroxy-4-pregnene-6α-methyl-20-one-21-acetate
17α,21-dihydroxy-4,6-pregnadiene-6-methyl-20-one
17α,21-dihydroxy-4,6-pregnadiene-6-methyl-20-one-21-acetate Under a nitrogen atmosphere a mixture of 17α,20,20,21-bis(methylendioxy) - 6α - methyl-4-pregnene-3-one (2.7 g.) in anhydrous benzene (60 ml.), ethyl oxalate (3 ml.) and sodium hydride (1 g.) is stirred for 4 hrs. The precipitated sodium salt of the resulting 2-ethoxyoxalate and the excess sodium hydride is filtered, washed with benzene, then hexane and dried for several hours in vacuo. The product is cautiously added in portions to a stirred ice-cold hydrochloric acid solution (10 cc. 35% acid—20 ml. ice-water) liberating the free ethoxyoxalate, which is extracted with dichloride. The extract is washed with water, dried and evaporated to yield 17α,20,20,21-bis(methylendioxy) - 2 - α-ethoxyoxalate-6-α-methyl-4-pregnene-3-one.

850 mg. of the above product are dissolved in 9.5 ml. of ethanol and heated with a solution of 300 mg. of phenylhydrazine acetate. The mixture is refluxed under nitrogen atmosphere for 30 minutes, diluted with water and the material which separates is extracted with ether. The ether extract is washed with water, dried and evaporated.

The 17α,20,20,21 - bis(methylendioxy)-6α-methyl-4-pregnene - [2,3 - d] - pyrazole-1'-phenyl-3'-carboethoxy is separated by chromatography on silica gel.

500 mg. of 17α,20,20,21-bis(methylendioxy)-6-α-methyl - 4 - pregneno - [2,3 - d] - pyrazole-1'-phenyl-3'-carboethoxy are dissolved in 5 ml. of methanol and allowed to react with 1.5 ml. of a 1.35 N solution of sodium methoxide in methanol at reflux temperature under a nitrogen atmosphere for 10 minutes. The alkoxide is neutralized with acetic acid and the mixture is then taken to dryness. The residue is washed with water, filtered and dried to give 17α,20,20,21-bis(methylendioxy)-6α-methyl-4-pregneno-[2,3-d]-pyrazole-1'-phenyl-3'-carboxy.

A 930 mg. aliquot of the above compound is suspended in 10 ml. of absolute ethanol and treated with a stoichiometric quantity of sodium ethoxide in ethanol. The system is then taken to dryness two times with anhydrous benzene. The residue suspended in anhydrous benzene is treated with 5 ml. of oxalyl chloride at 0° C. for 10 minutes. The system is taken to dryness and flushed several times with anhydrous n-hexane-benzene and again taken to dryness to give 17α, 20,20,21-bis(methylendioxy)-6α-methyl - 4 - pregnene - [2,3-d] - pyrazole-1'-phenyl-3'-carboxy-chloride.

The above compound (900 mg.) is dissolved in acetone and heated with 2 ml. of a 25% aqueous solution of sodium azide. After 15 minutes at room temperature the mixture is diluted with water and the material which separates is extracted with chloroform. The chloroform extract is first washed with a saturated solution of sodium chloride and then with water, dried and taken to dryness to give 17α,20,20,21 - bis-(methylendioxy)-6α-methyl-4-pregneno - [2,3-d] - pyrazole-1'-phenyl-5'-carboxy-azide.

A solution of 800 mg. of 17α,20,20,21-bis(methylendioxy) - 6α - methyl - 4 - pregneno - [2,3-d] - pyrazole-1' - phenyl - 3' - carboxyazide is dissolved in absolute ethanol and the mixture is refluxed for 24 hrs. The solution is then taken to dryness to give an amorphous solid, 17α,20,20,21 - bis - (methylendioxy) - 6α - methyl - 4 - pregneno - [2,3-d] - pyrazole - 1' - phenyl - 3' -N - ethyl - carbonate.

A solution of 500 mg. of 17α,20,20,21-bis(methylendioxy) - 6α - methyl - 4 - pregneno - [2,3-d] - pyrazole-1'-phenyl-5'-N-ethyl-carbonate is allowed to react with 2 ml. of a 10% aqueous solution of potassium carbonate under a nitrogen atmosphere at room temperature for 10 minutes. The carbonate is neutralized with acetic acid and the mixture is then taken to dryness. The residue washed with water and dried, after crystallization, yields 17α,20,20,21 - bis(methylendioxy) - 6α - methyl - 4 - pregneno - [2,3-d] - pyrazole - 1' - phenyl - 3' - amino. The 17α,20,20,21 - bis - (methylendioxy) - 6α - methyl - 4 - pregneno - [2,3 - d] - pyrazole - 1' - phenyl - 3' - amino (700 mg.) is heated in a steam bath with 25 ml. of a 60% aqueous solution of formic acid for about 30 minutes. The excess reagent is removed in vacuo. The residue, dissolved in pyridine, is precipitated with water, dried to give an amorphous solid which is a mixture of 17α,21-dihydroxy - 6α - methyl - 4 - pregnene - 20 - one - [2,3-d]-pyrazole-1'-phenyl-3'-amino-21-formate and 17α,21 dihydroxy-6α-methyl - 4 - pregnene-20-one-[2,3-d]-pyrazole-1'-phenyl-3'-amino.

The above mixture is dissolved in 15 ml. of pure methanol and allowed to react with 1 ml. of a 1.35 N solution of sodium methoxide in methanol at room temperature under a nitrogen atmosphere for 10 minutes. The alkoxide is neutralized with acetic acid and the mixture is then taken to dryness, washed with water, filtered and dried to yield 17α,21-dihydroxy-6α-methyl-4-pregnene-20-one-[2,3-d]-pyrazole-1'-phenyl-3'-amino.

A solution of 1.2 g. of 17α,21-dihydroxy-6α-methyl-4-pregnene - 20 - one - [2,3 - d] - pyrazole - 1' - phenyl-3'-amino in 40 ml. of pure methanol is treated with benzaldehyde (1 ml.) for 12 hrs. at room temperature. After this time a solid is collected. Crystallization from methanol gives 17α,21-dihydroxy-6α-methyl-4-pregnene-20 - one - [2,3-d] - pyrazole - 1' - phenyl - 3' - N - benzylidene-amino.

In accordance with the above procedures but using an equivalent quantity of acetaldehyde in place of benzaldehyde, there is obtained the corresponding 5'-N-ethylideneamino.

In accordance with the above procedures, but starting with 17α,20,20,21 - bis(methylendioxy)-6α-methyl-4-pregneno - [2,3 - d] - pyrazole - 1' - phenyl - 3' - amino, there are obtained the corresponding 3'-N-benzylidene-amino and 3'-N-ethylidene-amino derivatives.

The 17α,21 - dihydroxy - 6α - methyl - 4 - pregnene - 20 - one - [2,3 - d] - pyrazole - 1' - phenyl - 3' - N - benzylidene-amino treated with pyridine and acetic anhydride gives, after crystallization from methanol, 21-acetoxy - 17α - dihydrox - 6α - methyl - 4 - pregnene - 20 - one - [2,3-d] - pyrazole - 1' - phenyl - 3' - N - benzylidene-amino.

An aliquot of 550 mg. of this compound in acetone is treated with a solution of hydrochloric acid (4 N) for 30 minutes at room temperature and the material which separates is recovered by filtration, dried over phosphorus pentoxide under vacuum to give 21 acetoxy-17α,21-dihydroxy - 6α - methyl - 4 - pregnene - 20 - one - [2,3 - d]-pyrazole - 1' - phenyl - 3' - amino-hydrochloride. Neutralization of this product with triethylamine gives 21-acetoxy - 17α,21 - dihydroxy - 6α - methyl - 4 - pregnene - 20-one-[2,3-d]-pyrazole-1'-phenyl-3'-amino. The above compound (300 mg.) treated with pyridine and acetic anhydride yields 21-acetoxy-17α,21-dihydroxy-6α-methyl-4-pregnene - 20 - one - [2,3 - d] - pyrazole - 1' - phenyl - 3'-acetamido.

17α,20,20,21 - bis(methylendioxy) - 6α - methyl - 4-pregnene-[2,3-d]-pyrazole-1'-phenyl-3'-amino (500 mg.) dissolved in 4 ml. of pyridine and treated with 2 ml. of acetic anhydride, yields, after precipitation with ice-water and crystallization, 17α,20,20,21-bis(methylendioxy)-6α-methyl - 4 - pregneno - [2,3 - d] - pyrazole - 1' - phenyl-3'-acetamido.

In accordance with the above procedure, but using an equivalent quantity of another acylating agent in place of acetic anhydride, there is obtained the corresponding 3'-acylamido.

The 17α,20,20,21 - bis(methylendioxy) - 6α - methyl-4-pregneno-[2,3-d]-pyrazole-1'-phenyl-3'-acetamido (500 mg.) is heated on a steam bath with 30 ml. of a 50% aqueous solution of acetic acid for about 2 hrs. The excess reagent is removed in vacuo. The residue is dissolved in pyridine and then precipitated with water. The solid is recovered by filtration. The product, washed with water and dried, yields 17α,21-dihydroxy-6α-methyl-4-pregnene-20-one-[2,3-d]-pyrazole-1'-phenyl-3'-acetamido.

A solution of 500 mg. of 17α,20,20,21-bis(methylendioxy) - 6α - methyl - 4 - pregneno - [2,3 - d] - pyrazole-1'-phenyl-3'-N-benzylidene-amino in 15 ml. of tetrahydrofuran is heated with a suspension of 200 mg. of lithium aluminum hydride in 10 ml. of tetrahydrofuran. The mixture is refluxed under stirring for one hour. The excess reagent is destroyed with ethyl acetate. The solution diluted with ethyl acetate, washed 2 times with a dilute solution of hydrochloric acid and 3 times with a 10% solution of sodium bicarbonate and then to neautrality with water, is dried and evaporated to dryness in vacuo. The crystallization of the resulting product yields 17α,20,20,21 - bis(methylendioxy) - 6α - methyl - 4 - pregneno-[2,3,-d]-pyrazole-1'-phenyl-3'-N-benzyl-amino.

In accordance with the above procedure but starting with 17α,20,20,21 - bis(methylendioxy - 6α - methyl - 4-pregnene - [2,3 - d] - pyrazole - 1' - phenyl - 3' - N - ethylidene-amino, we obtain 17α,20,20,21-bis(methylendioxy)-6α - methyl - 4 - pregneno - [2,3 - d] - pyrazole - 1' - N-ethyl-amino.

A solution of 1 g. of 17α,20,20,21-bis(methylendioxy)-6α - methyl - 4 - pregneno - [2,3 - d] - pyrazole - 1'-phenyl-3'-N-ethyl-amino in 15 ml. of 80% (v./v.) acetic acid is refluxed for one hour. The solution is diluted with ice-water (40 ml.) and extracted with ethyl acetate. The ethyl acetate extracts are washed with water and with a saturated sodium bicarbonate solution, dried and evaporated to dryness in vacuo. Crystallization of the resulting product yields 17α,21-dihydroxy-6α-methyl-4-pregnene - 20 - one - [2,3 - d] - pyrazole - 1' - phenyl - 3' - N-ethyl-21-acetate.

To a solution of 200 mg. of 17α,21-dihydroxy-6α-methyl - 4 - pregnene - 20 - one - [2,3 - d] - pyrazole - 1'-phenyl-3'-acetamido in 3 ml. of pyridine cooled to 0° C. are added 0.045 ml. of methane sulfonyl chloride. The resulting mixture is allowed to stand at a temperature of about 0° C. for a period of approximately one hour. Water is then added to the reaction mixture and the precipitate which forms is recovered by filtration, washed with water and dried to give 17α,21-dihydroxy-6α-methyl-4 - pregnene - 20 - one - [2,3 - d] - pyrazole - 1' - phenyl-3'-acetamido-21-mesylate.

To a solution of 200 mg. of 17α,21-dihydroxy-6α-methyl - 4 - pregnene - 20 - one - [2,3 - d] - pyrazole - 1'-phenyl-3'-acetamido-21-mesylate dissolved in 15 ml. of acetone are added 350 mg. of sodium iodide. The resulting mixture is heated at reflux temperature for a period of about one hour and the reaction solution is cooled at room temperature and diluted with water. The material which precipitates is recovered by filtration, washed with water and dried to give 21-iodo-17α-hydroxy-6α-methyl-4 - pregnene - 20 - one - [2,3 - d] - pyrazole - 1' - phenyl-3'-acetamido.

The 21 - iodo - 17α - hydroxy - 6α - methyl - 4 - pregnene - 20 - one - [2,3 - d] - pyrazole - 1' - phenyl - 3'-acetamido (250 mg.) is dissolved in a mixture of 10 ml. of water and 10 ml. of ethanol. To the resulting suspension is added 750 mg. of sodium bisulfite and the mixture is heated under reflux for 1 hour. The reaction solution is cooled, diluted with water and the material which separates is recovered by filtration. The product is washed with water, dried and recrystallized from ethyl acetate to yield 17α-hydroxy-6α-methyl-4-pregnene-20-one-[2,3-d]-pyrazole-1'-phenyl-3'-acetamido.

In accordance with the above procedure, but starting with the preparation of the 21-mesylate, we prepared the 17α - hydroxy - 6α - methyl - 20 - one - 4 - pregnene-[2,3-d]-pyrazole-1'-phenyl of:

3'-N-benzylidene-amino
3'-N-benzyl-amino

3'-N-ethylidene-amino
3'-N-ethyl-amino.

The 17α - hydroxy - 6α - methyl - 20 - one - 4 - pregneno - [2,3 - d] - pyrazole - 1' - phenyl - 3' - N - benzylidene-amino (500 mg.) is dissolved in acetone and treated with 1 ml. of hydrochloric acid at room temperature for 30 minutes. The solution is neutralized with a 10% solution of sodium hydroxide. After dilution with water, the product which separates is recovered by filtration. The product is washed with water, dried and recrystallized to yield 17α-hydroxy-6α-methyl-4-pregnene-20-one-[2,3-d]-pyrazole-1'-phenyl-3'-amino.

In accordance with the above procedures, but starting with the corresponding derivatives there are obtained as products the [2,3-d] - pyrazole-1'-N-substituted-3'-amino of the following compounds:

11β,17α,21-trihydroxy-4-pregnene-20-one
11β,17α,21-trihydroxy-4-pregnene-20-one-21-acetate
11β,17α,21-trihydroxy-4-pregnene-6α-methyl-9α-fluoro-20-one
11β,17α,21-trihydroxy-4-pregnene-6α-methyl-9α-fluoro-20-one-21-acetate
11β,17α,21-trihydroxy-4-pregnene-6α,16α-dimethyl-9α-fluoro-20-one
11β,17α,21-trihydroxy-4-pregnene-6α,16α-dimethyl-9α-fluoro-20-one-21-acetate
11β,17α,21-trihydroxy-4-pregnene-16β-methyl-9α-fluoro-20-one
11β,17α,21-trihydroxy-4-pregnene-16β-methyl-9α-fluoro-20-one-21-acetate
11β,17α,21-trihydroxy-4-pregnene-16α-methyl-9α-fluoro-20-one
11β,17α,21-trihydroxy-4-pregnene-16α-methyl-9α-fluoro-20-one-21-acetate
11β,17α,21-trihydroxy-4-pregnene-6α-methyl-16α-methyl-9α-fluoro-20-one
11β,17α,21-trihydroxy-4-pregnene-6α-methyl-16α-methyl-9α-fluoro-20-one-21-acetate
17α,21-dihydroxy-4-pregnene-16β-methyl-9α-11,20-dione
17α,21-dihydroxy-4-pregnene-16β-methyl-9α-fluoro-11,20-dione-21-aceate
17α,21-dihydroxy-4-pregnene-20-one
17α,21-dihydroxy-4-pregnene-20-one-21-acetate
17α,21-dihydroxy-4-pregnene-16β-methyl-20-one-21-acetate
17α,21-dihydroxy-4-pregnene-16β-methyl-20-one
17α,21-dihydroxy-4-pregnene-16α-methyl-20-one
17α,21-dihydroxy-4-pregnene-16α-methyl-20-one-21-acetate
17α,21-dihydroxy-4-pregnene-6α-methyl-20-one
17α,21-dihydroxy-4-pregnene-6α-methyl-20-one-21-acetate
17α,21-dihydroxy-4,6-pregnadiene-6-methyl-20-one fluoro-11,20-dione
17α,21-dihydroxy-4,6-pregnadiene-6-methyl-20-one-21-acetate.

The 17α,20,20,21 - bis(methylendioxy) - 6α-methyl-4-pregneno-[2,3-d]-pyrazole-1'-phenyl-3'-amino (500 mg.) is dissolved in 60 ml. of tert-butyl-alcohol and treated with 550 mg. of chloranil. The mixture is heated under reflux temperature for 4 hrs. under a nitrogen atmosphere. The reaction mixture is cooled and diluted with ether and the chloranil which precipitates is recovered by filtration. The ether solution is washed with a dilute solution of sodium hydroxide and then with water, dried and then the solvent is distilled in vacuo to yield 17α,20,20,21-bis(methylendioxy)-6-methyl-4,6 - pregnadiene-[2,3-d]-pyrazole-1'-phenyl-3'-amino.

500 mg. of 17α,20,20,21 - bis(methylendioxy) - 6-methyl - 4,6 - pregnadiene - [2,3-d]-pyrazole-1'-phenyl-3'-acetoxy are dissolved in 20 ml. of 80% (v./v.) acetic acid and refluxed for 1.5 hrs. This solution is diluted with 100 ml. of ice-water and the material which precipitates is recovered by filtration, washed with water and dissolved in pyridine. The pyridine solution is diluted with ethyl acetate and extracted with a dilute solution of hydrochloric acid and then with water to neutrality. The ethyl acetate extract is dried and taken to dryness to yield after crystallization from methanol, 17α,21 - dihydroxy - 6-methyl - 4,6 - pregnadiene - [2,3-d]-pyrazole-1'-phenyl-3',21-diacetoxy.

To a solution of 200 mg. of 17α,21 - dihydroxy - 6α-methyl - 4,6 - pregnadiene-[2,3-d]-pyrazole - 1'-phenyl-3',21-diacetoxy in 10 ml. of methanol are added 0.7 ml. of a 1.33 N solution of sodium methoxide in methanol at room temperature under a nitrogen atmosphere for 10 minutes. The alkoxide is neutralized with acetic acid and the mixture is then taken to dryness. The residue is washed with water, filtered and dried to give 17α,21-dihydroxy - 6 - methyl-4,6-pregnadiene-[2,3-d]-pyrazole-1'-phenyl-3'-hydroxy.

In accordance with the above procedures, but starting with the corresponding derivatives there are obtained as products the following pyrazoles of the 4,6-pregnadiene and 4-pregnene series:

[3,2-c]-pyrazole-5'-carboethoxy
[2,3-d]pyrazole-1'-N-substituted-3'-carboethoxy
[2,3-d]-pyrazole-1'-N-substituted-3'-amino
[2,3-d]-pyrazole-1'-N-substituted-3'-N-benzyl-amino and their 21-acetate
[2,3-d]-pyrazole-1'-N-substituted-3'-N-ethyl - amino and their 21-acetate
[3,2-c]-pyrazole-1'-N-substituted-5'-amino and their 21-acetate
[3,2-c]-pyrazole-1'-N-substituted-5'-acetoxy and their 21-acetate
[2,3-d]-pyrazole-1'-N-substituted-3'-amino and their 21-acetate
[2,3-d]-pyrazole-1'-N-substituted-3'-acetoxy and their 21-acetate of the following compounds:

11β,17α,21-trihydroxy-4-pregnene-20-one
11β,17α,21-trihydroxy-4-pregnene-20-one-21-acetate
11β,17α,21-trihydroxy-4-pregnene-6α-methyl-9α-fluoro-20-one
11β,17α,21-trihydroxy-4-pregnene-6α-methyl-9α-fluoro-20-one-21-acetate
11β,17α,21-trihydroxy-4-pregnene-6α,16α - dimethyl - 9α-fluoro-20-one
11β,17α,21-trihydroxy-4-pregnene-6α,16α - dimethyl - 9α-fluoro-20-one-21-acetate
11β,17α,21-trihydroxy-4-pregnene-16β-methyl-9α-fluoro-20-one
11β,17α,21-trihydroxy-4-pregnene-16β-methyl-9α-fluoro-20-one-21-acetate
11β,17α,21-trihydroxy-4-pregnene-16α-methyl-9α-fluoro-20-one
11β,17α,21-trihydroxy-4-pregnene-16α-methyl-9α-fluoro-20-one-21-acetate
11β,17α,21-trihydroxy-4-pregnene-6α-methyl-16α-methyl-9α-fluoro-20-one
11β,17α,21-trihydroxy-4-pregnene-6α-methyl-16α-methyl-9α-fluoro-20-one-21-acetate
17α,21-dihydroxy-4-pregnene-16β-methyl-9α-fluoro-11,20-dione
17α,21-dihydroxy-4-pregnene-16β-methyl-9α-fluoro-11,20-dione-21-acetate
17α,21-dihydroxy-4-pregnene-20-one
17α,21-dihydroxy-4-pregnene-20-one-21-acetate
17α,21-dihydroxy-4-pregnene-16β-methyl-20-one-21-acetate
17α,21-dihydroxy-4-pregnene-16β-methyl-20-one
17α,21-dihhydroxy-4-pregnene-16α-methyl-20-one
17α,21-dihydroxy-4-pregnane-16α-methyl-20-one-21-acetate
17α,21-dihydroxy-4-pregnene-6α-methyl-20-one 17α,21-dihydroxy-4-pregnene-6α-methyl-20-one-21-acetate
17α,21-dihydroxy-4,6-pregnadiene-6-methyl-20-one
17α,21-dihydroxy-4,6 - pragnadiene-6 - methyl-20-one-21-acetate.

Example 2

In a nitrogen atmosphere, a mixture of 17α-hydroxy-6α-methyl-20,20-ethylendioxy-4-pregnene-3-one (5 g.) in anhydrous benzene (150 ml.), ethyl oxalate (5 ml.) and sodium hydride (2 g.) was stirred for 4 hrs. The precipitated sodium salt of the 2-ethoxyoxalate and the excess sodium hydride was filtered, washed with benzene, then hexane, and dried for several hours in vacuo. The product dissolved in water was added to a saturated solution of sodium dihydrogen phosphate and the product which separates was extracted with methylene dichloride to yield 17α - hydroxy-6α-methyl-2-ethoxyoxalate-20,20-ethylendioxy-4-pregnene-3-one.

1.500 g. of the above compound in 60 ml. of absolute ethanol are treated with an ethanolic solution of phenylhydrazine acetate.

The mixture is refluxed in a nitrogen atmosphere for about 45 minutes and then evaporated to dryness under reduced pressure. Crystallization from methanol yields 17α-hydroxy-6α-methyl-20,20-ethylendioxy - 4 - pregnene [2,3-d]-pyrazole-1'-phenyl-3'-carbomethoxy.

In accordance with the above procedure but using other hydrazine derivatives there are obtained the corresponding [2,3 - d] - pyrazole-1'-N-substituted-3'-carbomethoxy derivatives.

In accordance with the above procedures but starting with 17α - acetoxy-6α-methyl-2α-cyano-4-pregnene-3,20-dione, there is obtained the corresponding 17α-acetoxy-6α-methyl - 20 - one-4-pregnene-[3,2-c]-pyrazole-1'-N-substituted-5'-amino derivatives.

The 17α-hydroxy - 6α - methyl-20,20-ethylendioxy-4-pregnene - [2,3 - d] - pyrazole-1'-phenyl-3'-carboethoxy (300 mg.) is dissolved in 5 ml. of methanol and allowed to react with 1.5 ml. of a 1.35 N solution of sodium methoxide in methanol at room temperature under a nitrogen atmosphere for 10 minutes.

The alkoxide is neutralized with acetic acid and the mixture is then taken to dryness.

The residue is washed with water, filtered and dried to give 17α - hydroxy-20,20-ethylendioxy-6α-methyl-4-pregnene-[2,3-d]-pyrazole-1'-phenyl-3'-carboxy.

A solution of 200 mg. of 17α-hydroxy-6α-methyl-4-pregnene - 20,20 - ethylendioxy - [2,3 - d]-pyrazole-1'-phenyl-3'-carboxy in 3 ml. of acetic anhydride is refluxed for 1 hr. with 30 mg. of p-toluenesulfonic acid.

The p-toluenesulfonic acid is neutralized with 1 ml. of pyridine, and resulting solution diluted with ice-water, yields a precipitate which is recovered by filtration, washed with water and dried to give 17α-acetoxy-6α-methyl-4-pregnene-20-one - [2,3-d] - pyrazole-1'-phenyl-3'-carboxy.

In accordance with the above procedure, but using another acylating agent in place of acetic anhydride there is obtained the corresponding 17α-acyloxy-6α-methyl-4-pregnene-20-one-[2,3-d]-pyrazole-1'-phenyl-3'-carboxy.

To a solution of 950 mg. of 17α-acetoxy-6α-methyl-4-pregnene-20-one-[2,3-d]-pyrazole-1'-phenyl-3'-carboxy in 10 ml. of absolute ethanol is added the stoichiometric quantity of sodium ethoxide in ethanol.

Then the system is taken to dryness, in vacuo, at about 20° C. and this is repeated twice with dry benzene.

The residue suspended in anhydrous benzene is treated with 5 ml. of oxalyl chloride at 0° C. for ten minutes.

The system is taken to dryness to give 17α-acetoxy-6α-methyl-4-pregnene-20-one-[2,3-d]-pyrazole - 1' - phenyl-3'-carboxy-chloride.

A solution of 500 mg. of 17α-actoxy-6α-methyl-4-pregnene - 20 - one-[2,3-d]-pyrazole-1'-phenyl-3' - carboxy chloride in 20 ml. of acetone is treated with 2 ml. of a 25% aqueous solution of sodium azide.

After 15 minutes at room temperature, the mixture is diluted with water and the material which separates is extracted with chloroform. The chloroform extract is washed first with a saturated solution of sodium chloride, and then with water, dried, and then taken to dryness to give 17α-acetoxy - 6α-methyl-4-pregnene-20-one-[2,3-d]-pyrazole-1'-phenyl-3'-carboxy-azide.

A solution of 600 mg. of 17α-actoxy-6α-methyl-4-pregnene-20-one-[2,3-d] pyrazole-1'-phenyl-3'-carboxy - azide in absolute ethanol is refluxed for 30 hrs.

The mixture is then taken to dryness to give as an amorphous solid, 17α-acetoxy-6α-methyl-4-pregnene-20-one-[2,3-d]-pyrazole-1'-phenyl-3'-N-ethyl-carbamate.

500 mg. of the above compound are dissolved in 15 ml. of pure methanol and allowed to react with 2 ml. of a 2% solution of potassium hydrogen carbonate at room temperature under a nitrogen atmosphere for 15 minutes.

The mixture, neutralized with acetic acid, is then taken to dryness. The residue washed with water and dried, yields after crystallization, 17α - acetoxy-6α-methyl - 4 - pregnene-20-one-[2,3-d]-pyrazole-1'-phenyl-3'-amino.

To a solution of 500 mg. of 17α-acetoxy-6α-methyl-4-pregnene-20-one-[2,3 - d]-pyrazole-1'-phenyl-3'-amino in 40 ml. of tert-butyl-alcohol are added 600 mg. of chloranil.

The mixture is heated under reflux temperature for 5 hrs. under a nitrogen atmosphere.

The reaction mixture is cooled and diluted with ether and the chloranil which precipitates is recovered by filtration.

The ether solution is washed with a diluted solution of sodium hydroxide, and then with water.

The ether extract is dried and distilled in vacuo to yield 17α - acetoxy - 6α - methyl-4,6-pregnadiene-20-one-[2,3-d]-pyrazole-1'-phenyl-3'-amino.

A solution of 1 gr. of 17α-acetoxy-6α-methyl-4,6-pregnadiene-20-one-[2,3 - d]-pyrazole-1'-phenyl-3'-amino in 10 ml. of methanol is treated overnight with stirring with 2 ml. of acetaldehyde.

The mixture is then taken to dryness and the 17α-acetoxy - pregnadiene-20-one-[2,3-d]-pyrazole-1'-phenyl-3'-N-ethylidene-amino is separated by chromatography on silica gel.

In accordance with the above procedure but using benzaldehyde in place of acetaldehyde, we obtain 17α-acetoxy-6α-methyl - 4,6 - pregnadiene-20-one-[2,3 - d] - pyrazole-1'-phenyl-3'-N-benzylidene-amino.

In the same manner we obtain 17α-acetoxy-6α-methyl-4-pregnene - 20 - one - [3,2-c]-pyrazole-1'-phenyl-5'-N-ethylidene-amino and 17α-acetoxy-6α-methyl-4-pregnene-20 - one - [3,2 - c] - pyrazole-1'-phenyl-5'-N-benzylidene-amino.

A solution of 500 mg. of 17α-hydroxy-6α-methyl-4-pregnene - 20 - one - [2,3 - d] - pyrazole-1'-phenyl-3'-N-ethylamino (above prepared) in 8 ml. of acetic anhydride is refluxed for 1 hr. with 50 mg. of p-toluenesulfonic acid. Pyridine is added and dilution with ice water gives a precipitate which is recovered by filtration, washed with water and dried to give 17α-acetoxy-6α-methyl-4-pregnene-20-one-[2,3-d]-pyrazole-1'-phenyl-3'-N-ethyl-amino.

To a solution of 250 mg. of 17α-acetoxy-6α-methyl-4-pregnene - 20 - one - [2,3 - d] - pyrazole-1'-phenyl-3'-N-ethylamino in 30 ml. of tert-butyl-alcohol are added 600 mg. of chloranil. The mixture is heated under reflux for 5 hrs. under a nitrogen atmosphere. The reaction mixture is cooled and diluted with ether and the chloranil which precipitates is recovered by filtration. The ether solution is then taken to dryness and chromatographed over alumina to yield 17α-acetoxy-6α-methyl-4,6-pregnadiene-20-one-[2,3-d]-pyrazole-1'-phenyl-3'-N-ethyl-amino.

In accordance with the above procedure, but starting with a 3'-N-butyl derivative, we obtain the corresponding 4,6-pregnadiene-[2,3-d]-pyrazole.

In accordance with the above procedure, but starting with a 17α-acyl derivative, we obtain the corresponding 4,6-pregnadiene-[2,3-d]-pyrazole.

In accordance with the above procedures, but starting with the corresponding derivatives, there are obtained as products the following pyrazoles of the 4,6-pregnadiene and 4-pregnene series:

[2,3-d]-pyrazoles-1'-N-substituted-3'-amino
[3,2-c]-pyrazoles-1'-N-substituted-5'-amino
[2,3-d]-pyrazoles-1'-N-substituted-3'-benzyl-amino and 3'-ethyl-amino
[3,2-c]-pyrazoles-1'-N-substituted-5'-ethyl-amino and 5'-benzyl-amino of the following compounds:

17α-capronate-4-pregnene-20-dione
17α-hydroxy-4-pregnene-20-dione
17α-acetoxy-6-chloro-4,6-pregnadiene-20-dione
17α-hydroxy-6-chloro-4,6-pregnadiene-20-dione
17α-acetoxy-6-methyl-4,6-pregnadiene-20-dione
17α-hydroxy-6-methyl-4,6-pregnadiene-20-dione To a suspension of 10 g. of 2α-cyano-17α-hydroxy-6α-methyl-4-pregnene-3,20-dione in benzene (750 ml.) is added under reflux and stirring, 20 ml. of ethylene glycol and 1 g. of p-toluenesulfonic acid.

The reaction proceeds with elimination of water for 20 hrs. The mixture is cooled and 10 ml. of pyridine are added. The organic layer is extracted with water, then dried. The solvent evaporated in vacuo and the residual amorphous solid is triturated with ether to yield 17α-hydroxy-6α-methyl-2α-cyano-5-pregnene - 3,3 - 20,20 - diethylendioxy.

The 17α-hydroxy - 6α - methyl - 2α - cyano - 5 - pregnene-3,3-20,20-diethylendioxy (5 g.) is dissolved in 60 ml. of ethylene glycol and 20 ml. of a 40% aqueous solution of potassium hydroxide is added.

The system is refluxed with stirring for 20 hrs. The reaction mixture is cooled and diluted with a saturated aqueous solution of sodium dihydrogen phosphate. The material which separates is recovered by filtration to give 17α - hydroxy - 6α - methyl - 2α - carboxy - 5 - pregnene-3,3-20,20-diethylendioxy.

In accordance with the above procedure but using in place of a 40% solution of potassium hydroxide and ethylene glycol a solution in ethanol and 10% aqueous potassium carbonate, we obtain the 17α - hydroxy - 6α - methyl - 2α - carboxy - amide - 5 - pregnene - 3,3-20,20-diethylendioxy. 500 mg. of 17α-hydroxy-6α-methyl-2α-carboxy-5-pregnene-3,3-20,20-diethylendioxy in 5 ml. of pure methanol are treated with an excess of diazomethane. When the development of nitrogen stops, the system is taken to dryness to yield a crystalline residue. Recrystallization of the resulting product yields 17α-hydroxy-6α-methyl-2α-carbomethoxy-3,3-20,20-diethylendioxy.

500 mg. of 17α-hydroxy16α-methyl-2α-carboxy-amide-5-pregnene-3,3-20,20-diethylendioxy in 6 ml. of acetic anhydride are refluxed with 30 mg. of p-toluenesulfonic acid for 1 hr. to give 17α - acetoxy - 6α - methyl-2α-carboxy-amide-5-pregnene-20-one-3,3-ethylendioxy.

In accordance with the above procedure, but using another acylating agent, there are obtained the corresponding 17α-acyloxy-derivatives.

In accordance with the above procedure but starting with 17α-hydroxy-6α-methyl - 2α - carbomethoxy-5-pregnene-3,3-2,20-ethylendioxy, there is obtained the corresponding 17α-acyloxy-6α-methyl-2α - carbomethoxy - 5-pregnene-20-one-3,3-ethylendioxy.

200 mg. of 17α-acetoxy-6α-methyl-2α-carbomethoxy-5-pregnene-20-one-3,3-ethylendioxy are dissolved in 10 ml. of pure methanol and refluxed with 3 ml. of 4 N hydrochloric acid for 10 minutes. The reaction mixture is neutralized, extracted with ether and washed with water. The ether extract is dried and taken to dryness to yield, after crystallization, 17α-acetoxy-6α-methyl-2α-carbomethoxy-4-pregnene-3,20-dione.

In accordance with the above procedure, but starting with 17α-acetoxy-6α-methyl - 2α - carboxy-amide-5-pregnene-20-one-3,3-ethylendioxy, we obtain 17α-acetoxy-6α-methyl-2α-carboxy-amide-4-pregnene-3,20-dione.

The 17α-acetoxy-6α - methyl-2α-carbomethoxy-4-pregnene-3,20 - dione (500 mg.) is dissolved in 35 ml. of absolute ethanol and treated with an excess of phenyl hydrazine (1 ml.). The mixture is refluxed in a nitrogen atmosphere for about 2 hrs. and then evaporated to dryness under reduced pressure. The residue is separated by chromatography over alumina to yield, after crystallization from ether, 17α-acetoxy-6α - methyl-4-pregnene-20-one-[3,2-c]-pyrazole-1'-phenyl-5'-hydroxy.

In accordance with the above procedure, but starting with 17α-acetoxy-6α-methyl-2α-carboxy - amide-4-pregnene-3,20-dione, there is obtained the same product.

To a solution of 500 mg. of 17α-acetoxy-6α-methyl-4-pregnene-20-one-[3,2-c] - pyrazole-1'-ethyl-5'-hydroxy in 40 ml. of tert-butyl-alcohol are added 500 mg. of chloranil. The mixture is heated under reflux temperature for 10 hrs. under a nitrogen atmosphere. The reaction mixture is taken to dryness and after chromatography over alumina, there is obtained 17α-acetoxy-6α-methyl-4,6-pregnadiene-20-one-[3,2-c]-pyrazole-1'-ethyl-5'-hydroxy.

500 mg. of 17α-acetoxy-6α-methyl-2α-carbomethoxy-5-pregnene-20-one-3,3-ethylendioxy are dissolved in 15 ml. of dioxane and heated at reflux temperature with 300 mg. of phenyl-hydrazine for 2 hrs. The reaction solution, after being cooled, is diluted with ether to give 17α-acetoxy-6α-methyl-2α-carboxy-phenyl - hydrazide-5-pregnene-20-one-3,3-ethylendioxy. The above product is also obtained starting with the carboxy-amide derivative.

In accordance with the above procedure, but using in place of phenyl hydrazine another monosubstituted hydrazine and starting with the corresponding derivatives, we obtain as products 2α-carboxy-substituted-hydrazide-3,3-ethylendioxy.

To a solution of 500 mg. of 17α-acetoxy-6α-methyl-2α-carboxy-phenly-hydrazide-5-pregnene-20-one - 3,3-ethylendioxy in ethanol (20 ml.) are added 3 ml. of 4 N hydrochloric acid. The system is refluxed for 1 hr. and the reaction solution is neutralized, diluted with water and the material which separates is recovered by filtration to yield 17α-acetoxy - 6α - methyl-4-pregnene - 20-one - [2,3-d]-pyrazole-1'-phenyl-3'-hydroxy.

To a solution of 500 mg. of 17α-acetoxy-6α-methyl-4-pregnene-20-one-[2,3-d]-pyrazole-1'-phenyl-3'-hydroxy in 40 ml. of tert-butyl-alcohol are added 550 mg. of chloranil. The mixture is heated under reflux temperature for 10 hrs. under nitrogen atmosphere. The reaction mixture is taken to dryness and after chromatography over neutral alumina, there is obtained 17α-acetoxy-6α-methyl-4,6-pregnadiene - 20 - one - [2,3-d]-pyrazole-1'-phenyl-3'-hydroxy.

To a solution of 250 mg. of 17α-acetoxy-6α-methyl-4,6-pregnadiene-20-one-[2,3-d]-pyrazole - 1' - phenyl-3'-hydroxy dissolved in 15 ml. of methanol-methylene chloride (1:1 v./v.) is added an excess of an ethereal solution of diazomethane.

The reaction mixture is then taken to dryness and the residue is crystallized from methanol to yield 17α-acetoxy-6α-methyl-4,6 - pregnadiene-20-one - [2,3-d]-pyrazole-1'-phenyl-3'-methoxy.

In accordance with the above procedure, but using this time an excess of diazoethane there are obtained the corresponding 5'-ethoxy-derivatives.

To a solution of 300 mg. of 17α-acetoxy-6α-methyl-4,6-pregnadiene-20-one - [2,3-d] - pyrazole-1'-phenyl-3'-hydroxy in pyridine (3 ml.) are added 1.5 ml. of acetic anhydride. The mixture is allowed to stand overnight at room temperature. A mixture of ice and water is then added and the material which separates is recovered by filtration. The product crystallized from methanol yields 17α-acetoxy-6α-methyl-4,6-pregnadiene-20-one - [2,3-d]-pyrazole-1'-phenyl-3'acetoxy.

In accordance with the above procedures, but using another acylating agent in place of acetic anhydride there are obtained the corresponding 3'-acyloxy derivatives.

In accordance with the above procedures, but starting with the corresponding derivatives, there are obtained as products the following pyrazoles of the 4,6-pregnadiene and 4-pregnene series:

[3,2-c]-pyrazoles-1'-N-substituted-5'-hydroxy and their 5',17-acyloxy
[2,3-d]-pyrazoles-1'-N-substituted-3'-hydroxy and their 5',17-acyloxy
[3,2-c]-pyrazoles-1'-N-substituted-5'-alkoxy and their 17-acyloxy
[2,3-d]-pyrazoles-1'-N-substituted-3'-alkoxy and their 17-acyloxy of the following compounds:

$11\beta,17\alpha,21$-trihydroxy-4-pregnene-20-one
$11\beta,17\alpha,21$-trihydroxy-4-pregnene-20-one-21-acetate
$11\beta,17\alpha,21$-trihydroxy-4-pregnene-6$\alpha$-methyl-9$\alpha$-fluoro-20-one-21-acetate
$11\beta,17\alpha,21$-trihydroxy-4-pregnene-6$\alpha$,16$\alpha$-dimethyl-9$\alpha$-fluoro-20-one
$11\beta,17\alpha,21$-trihydroxy-4-pregnene-6$\alpha$,16$\alpha$-dimethyl-9$\alpha$-fluoro-20-one-21-acetate
$11\beta,17\alpha,21$-trihydroxy-4-pregnene-16$\beta$-methyl-9$\alpha$-fluoro-20-one
$11\beta,17\alpha,21$-trihydroxy-4-pregnene-16$\beta$-methyl-9$\alpha$-fluoro-20-one-21-acetate
$11\beta,17\alpha,21$-trihydroxy-4-pregnene-16$\alpha$-methyl-9$\alpha$-fluoro-20-one
$11\beta,17\alpha,21$-trihydroxy-4-pregnene-16$\alpha$-methyl-9$\alpha$-fluoro-20-one-21-acetate
$11\beta,17\alpha,21$-trihydroxy-4-pregneno-6$\alpha$-methyl-16$\alpha$-methyl-9$\alpha$-fluoro-20-one
$11\beta,17\alpha,21$-trihydroxy-4-pregnene-6$\alpha$-methyl-16$\alpha$-methyl-9$\alpha$-fluoro-20-one-21-acetate
$17\alpha,21$-dihydroxy-4-pregnene-16$\beta$-methyl-9$\alpha$-fluoro-11,20-dione
$17\alpha,21$-dihydroxy-4-pregnene-16$\beta$-methyl-9$\alpha$-fluoro-11,20-dione-21-acetate
$17\alpha,21$-dihydroxy-4-pregnene-20-one
$17\alpha,21$-dihydroxy-4-pregnene-20-one-21-acetate
$17\alpha,21$-dihydroxy-4-pregnene-16$\beta$-methyl-20-one-21-acetate
$17\alpha$-21-dihydroxy-4-pregnene-16$\alpha$-methyl-20-one
$17\alpha,21$-dihydroxy-4-pregnene-16$\alpha$-methyl-20-one
$17\alpha,21$-dihydroxy-4-pregnene-16$\alpha$-methyl-20-one-21-acetate
$17\alpha,21$-dihydroxy-pregnene-6$\alpha$-methyl-20-one
$17\alpha,21$-dihydroxy-4-pregnene-6$\alpha$-methyl-20-one-21-acetate
$17\alpha,21$-dihydroxy-4,6-pregnadiene-6-methyl-20-one
$17\alpha,21$-dihydroxy-4,6-pregnadiene-6-methyl-20-one-21-acetate.

500 mg. of 17$\alpha$,20,20,21-bis(methylendioxy)-5$\alpha$-pregnane-[3,2-c]-isoxazole-5'-amino are dissolved in 8 ml. of ethanol and hydrogenated in the presence of 100 mg. of Adams platinum until 1 molar equivalent of hydrogen has been absorbed. The mixture is filtered from the catalyst and concentrated to dryness. Crystallization from methanol yield 17$\alpha$,20,20,21 - bis(methylendioxy) - 2$\alpha$-carboxy-amide-3-amino-5$\alpha$-pregn-2-ene.

A solution of 250 mg. of 17$\alpha$,20,20,21-bis(methylendioxy)-2$\alpha$-carboxy-amide-3-amino-5$\alpha$-pregn-2-ene in 5 ml. of acetone is allowed to react with 2 ml. of 4 N hydrochloric acid for 30 minutes at room temperature.

The reaction solution is diluted with water and the material which precipitates is recovered by filtration to give 17$\alpha$,20,20,21 - bis(methylendioxy)-2$\alpha$-carboxy-amide-5$\alpha$-pregnane-3-one.

To a suspension of 3 g. of 17$\alpha$,20,20,21-bis(methylendioxy)-2$\alpha$-carboxy - amide-5$\alpha$-pregnane-3-one in toluene are added under stirring 5 ml. of ethylene glycol and 300 mg. of p-toluenesulfonic acid. The reaction proceeds with elimination of water for 6 hrs. The mixture is cooled, washed with a 10% solution of sodium carbonate and then dried. The solvent is evaporated in vacuo. The residue, crystallized from methanol, yields 3,3-ethylendioxy-17$\alpha$,20,20,21 - bis(methylendioxy) - 2$\alpha$ - carboxy-amide-5$\alpha$-pregnane.

In accordance with the above procedure, but starting with 17$\alpha$,20,20,21-bis(methylendioxy)-2$\alpha$-carboxy-amide-5$\alpha$-pregnane-3-one and 3,3-ethylendioxy - 17$\alpha$,20,20,21-bis(methylendioxy)-2$\alpha$-carboxy - amide-5$\alpha$-pregnane, we obtain the pyrazoles of the following pregnane series:

[3,2-c]-pyrazoles-1'-N-substituted-5'-hydroxy
[2,3-d]-pyrazoles-1'-N-substituted-3'-hydroxy of the following compounds:

$11\beta,17\alpha,21$-trihydroxy-5$\alpha$-pregnane-20-one
$11\beta,17\alpha,21$-trihydroxy-5$\alpha$-pregnane-20-one-21-acetate
$11\beta,17\alpha,21$-trihydroxy-5$\alpha$-pregnane-16$\beta$-methyl-9$\alpha$-fluoro-20-one
$11\beta,17\alpha,21$-trihydroxy-5$\alpha$-pregnane-16$\beta$-methyl-9$\alpha$-fluoro-20-one-21-acetate
$11\beta,17\alpha,21$-trihydroxy-5$\alpha$-pregnane-16$\alpha$-methyl-9$\alpha$-fluoro-20-one
$11\beta,17\alpha,21$-trihydroxy-5$\alpha$-pregnane-16$\alpha$-methyl-9$\alpha$-fluoro-20-one-21-acetate
$17\alpha,21$-dihydroxy-5$\alpha$-pregnane-16$\beta$-methyl-9$\alpha$-fluoro-11,20-dione
$17\alpha,21$-dihydroxy-5$\alpha$-pregnane-16$\beta$-methyl-9$\alpha$-fluoro-11,20-dione-21-acetate
$17\alpha,21$-dihydroxy-5$\alpha$-pregnane-20-one
$17\alpha,21$-dihydroxy-5$\alpha$-pregnane-20-one-21-acetate
$17\alpha,21$-dihydroxy-5$\alpha$-pregnane-16$\beta$-methyl-20-one-21-acetate
$17\alpha,21$-dihydroxy-5$\alpha$-pregnane-16$\beta$-methyl-20-one
$17\alpha,21$-dihydroxy-5$\alpha$-pregnane-16$\alpha$-methyl-20-one
$17\alpha,21$-dihydroxy-5$\alpha$-pregnane-16$\alpha$-methyl-20-one-21-acetate
$17\alpha$-caproate-5$\alpha$-pregnane-20-dione
$17\alpha$-hydroxy-5$\alpha$-pregnane-20-dione.

What we claim is:
1. The compounds having the tautomeric forms of the formulae

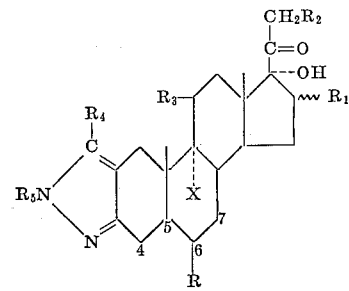

and

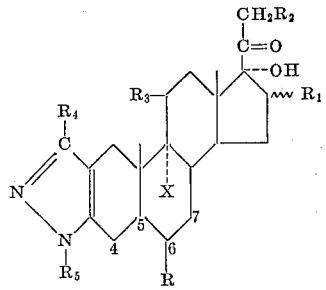

wherein R is a member selected from the group consisting of hydrogen, methyl, fluoro and chloro; $R_1$ is a member selected from the group consisting of hydrogen, α-methyl and β-methyl; $R_2$ is a member selected from the group consisting of hydrogen, hydroxy and acyloxy in which the acyl radical derived from an aliphatic acid having from 1 to 10 carbon atoms; $R_3$ is a member selected from the group consisting of hydrogen, keto and β-hydroxy; $R_4$ is a member selected from the group consisting of amino, alkylamino, acylamino, arylamino, hydroxy, acyloxy in which the acyl radical is derived from an aliphatic acid having from 1 to 10 carbon atoms and lower alkoxy; $R_5$ is a member selected from the group consisting of hydrogen, alkyl, aryl and aralkyl; X is a member selected from the group consisting of hydrogen and fluoro and the bonds between the 4,5- and 6,7-carbon atoms are selected from the group consisting of a single bond and a double bond.

2. The compounds of the formula

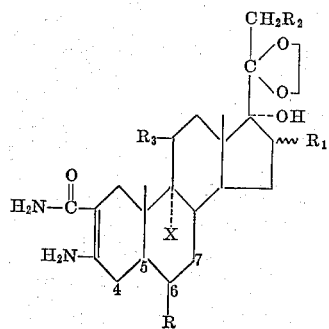

wherein R is a member selected from the group consisting of hydrogen, methyl, chloro and fluoro; $R_1$ is a member selected from the group consisting of hydrogen, α-methyl and β-methyl; $R_2$ is a member selected from the group consisting of hydrogen and hydroxy; $R_3$ is a member selected from the group consisting of hydrogen, keto and β-hydroxy; 5 is a member selected from the group consisting of hydrogen and fluoro and the bonds between the 4,5- and 6,7-carbon atoms are selected from the group consisting of a single bond and a double bond.

3. The compound of the formula

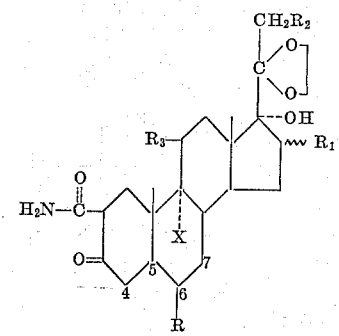

wherein R is a member selected from the group consisting of hydrogen, methyl, chloro and fluoro; $R_1$ is a member selected from the group consisting of hydrogen, α-methyl and β-methyl; $R_2$ is a member selected from the group consisting of hydrogen and hydroxy; $R_3$ is a member selected from the group consisting of hydrogen, keto and β-hydroxy; X is a member selected from the group consisting of hydrogen and fluoro and the bonds between 4,5- and 6,7-carbon atoms are selected from the group consisting of a single bond and a double bond.

4. The compounds of the formula

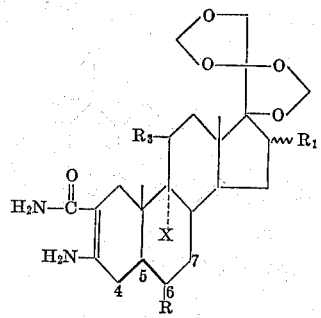

wherein R is a member selected from the group consisting of hydrogen, methyl, chloro and fluoro; $R_1$ is a member selected from the group consisting of hydrogen, α-methyl and β-methyl; $R_3$ is a member selected from the group consisting of hydrogen, keto and β-hydroxy; X is a member selected from the group consisting of hydrogen and fluoro and the bonds between the 4,5- and 6,7-carbon atoms are selected from the group consisting of a single bond and a double bond.

5. The compounds of the formula

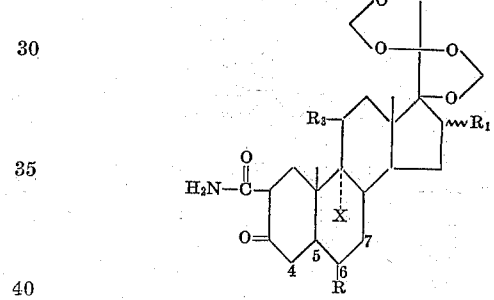

wherein R is a member selected from the group consisting of hydrogen, methyl, chloro and fluoro; $R_1$ is a member selected from the group consisting of hydrogen, α-methyl and β-methyl; $R_3$ is a member selected from the group consisting of hydrogen, keto and β-hydroxy; X is a member selected from the group consisting of hydrogen and fluoro and the bonds between the 4,5- and 6,7-carbon atoms are selected from the group consisting of a single bond and a double bond.

6. The compounds of the formula

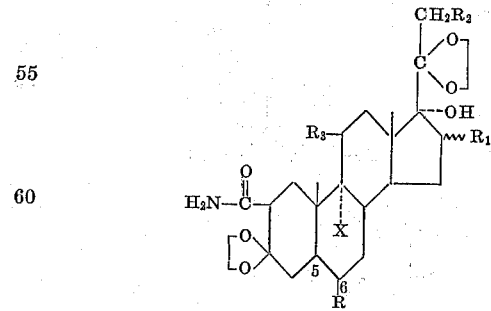

wherein R is a member selected from the group consisting of hydrogen, methyl, chloro and fluoro; $R_1$ is a member selected from the group consisting of hydrogen, α-methyl and β-methyl; $R_2$ is a member selected from the group consisting of hydrogen and hydroxy; $R_3$ is a member selected from the group consisting of hydrogen, keto and β-hydroxy; X is a member selected from the group consisting of hydrogen and fluoro and the bond between the 5- and 6-carbon atoms is selected from the group consisting of single bond and a double bond.

7. The compounds of the formula

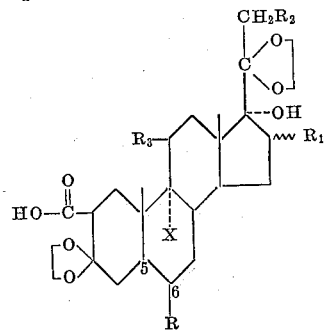

wherein R is a member selected from the group consisting of hydrogen, methyl, chloro and fluoro; $R_1$ is a member selected from the group consisting of hydrogen, α-methyl and β-methyl, $R_2$ is a member selected from the group consisting of hydrogen and hydroxy; $R_3$ is a member selected from the group consisting of hydrogen, keto and β-hydroxy; X is a member selected from the group consisting of hydrogen and fluoro and the bond between the 4- and 6-carbon atoms is selected from the group consisting of a single bond and a double bond.

8. The compounds of the formula

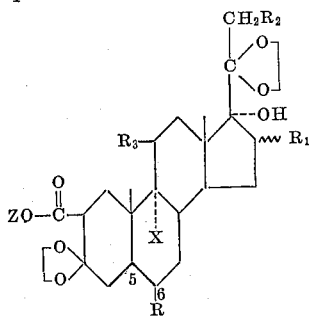

wherein R is a member selected from the group consisting of hydrogen, methyl, chloro and fluoro; $R_1$ is a member selected from the group consisting of hydrogen, α-methyl and β-methyl; $R_2$ is a member selected from the group consisting of hydrogen and hydroxy; $R_3$ is a member selected from the group consisting of hydrogen, keto and β-hydroxy; X is a member selected from the group consisting of hydrogen and fluoro; Z is alkyl and the bond between the 5- and 6-carbon atoms is selected from the group consisting of a single bond and a double bond.

9. The compounds of the formula

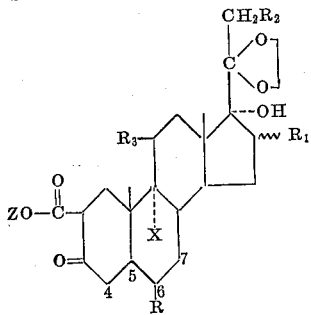

wherein R is a member selected from the group consisting of hydrogen, chloro and fluoro; $R_1$ is a member selected from the group consisting of hydrogen, α-methyl and β-methyl; $R_2$ is a member selected from the group consisting of hydrogen and hydroxy; $R_3$ is a member selected from the group consisting of hydrogen, keto and β-hydroxyl; X is a member selected from the group consisting of hydrogen and fluoro; Z is alkyl and the bonds between the 4,5- and 6,7-carbon atoms are selected from the group consisting of a single bond and a double bond.

10. The compounds of the formula

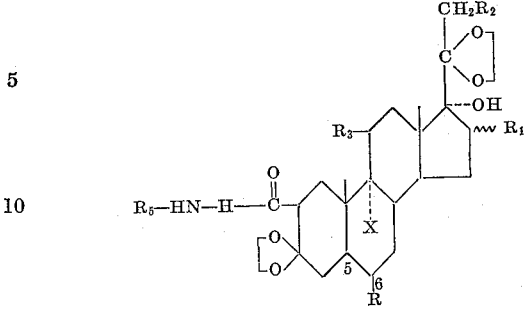

wherein R is a member selected from the group consisting of hydrogen, methyl, chloro and fluoro; $R_1$ is a member selected from the group consisting of hydrogen, α-methyl and β-methyl; $R_2$ is a member selected from the group consisting of hydrogen and hydroxy; $R_3$ is a member selected from the group consisting of hydrogen, keto and β-hydroxy; $R_5$ is a member selected from the group consisting of hydrogen, alkyl, aryl and aralkyl; X is a member selected from the group consisting of hydrogen and fluoro and the bond between the 5- and 6-carbon atoms is selected from the group consisting of a single bond and a double bond.

11. The compounds of the formula

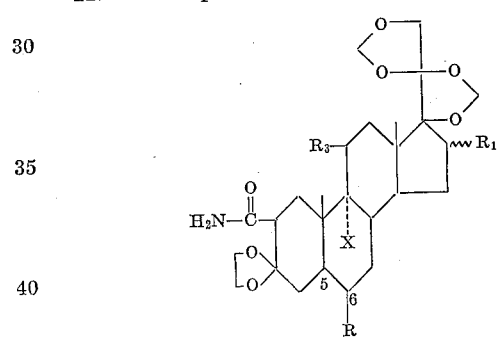

wherein R is a member selected from the group consisting of hydrogen, methyl, chloro and fluoro; $R_1$ is a member selected from the group consisting of hydrogen, α-methyl and β-methyl; $R_3$ is a member selected from the group consisting of hydrogen, keto and β-hydroxy; X is a member selected from the group consisting of hydrogen and fluoro and the bond between the 5- and 6-carbon atoms is selected from the group consisting of a single bond and a double bond.

12. The compounds of the formula

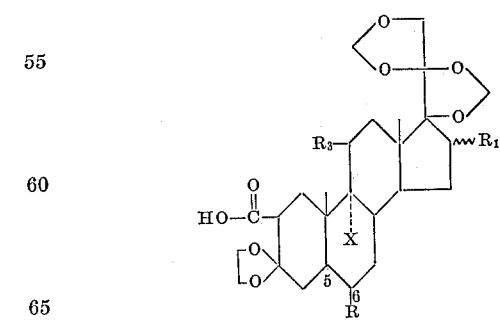

wherein R is a member selected from the group consisting of hydrogen, methyl, chloro and fluoro; $R_1$ is a member selected from the group consisting of hydrogen, α-methyl and β-methyl; $R_3$ is a member selected from the group consisting of hydrogen, keto and β-hydroxy; X is a member selected from the group consisting of hydrogen and fluoro and the bond between the 5- and 6-carbon atoms is selected from the group consisting of a single bond and a double bond.

13. The compounds of the formula

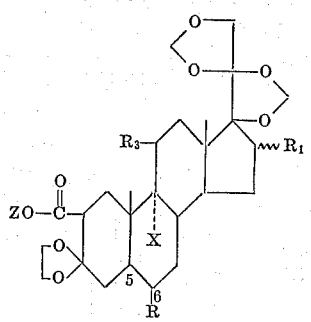

wherein R is a member selected from the group consisting of hydrogen, methyl, chloro and fluoro; $R_1$ is a member selected from the group consisting of hydrogen, α-methyl and β-methyl; $R_3$ is a member selected from the group consisting of hydrogen, keto and β-hydroxy; X is a member selected from the group consisting of hydrogen and fluoro; Z is alkyl and the bond between the 5- and 6-carbon atoms is selected from the group consisting of a single bond and a double bond.

14. The compounds of the formula

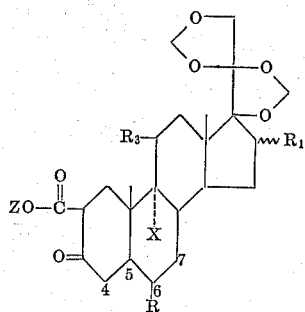

wherein R is a member selected from the group consisting of hydrogen, methyl, chloro and fluoro; $R_1$ is a member selected from the group consisting of hydrogen, α-methyl and β-methyl; $R_3$ is a member selected from the group consisting of hydrogen, keto and β-hydroxy; X is a member selected from the group consisting of hydrogen and fluoro; Z is alkyl and the bonds between the 4,5- and 6,7-carbon atoms are selected from the group consisting of a single bond and a double bond.

15. The compounds of the formula

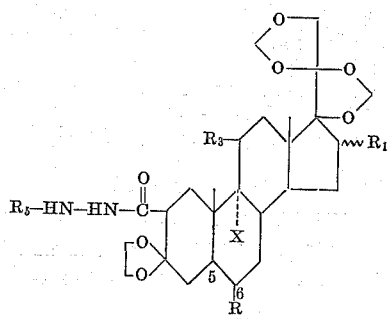

wherein R is a member selected from the group consisting of hydrogen, methyl, chloro and fluoro; $R_1$ is a member selected from the group consisting of hydrogen, α-methyl and β-methyl; $R_3$ is a member selected from the group consisting of hydrogen, keto and β-hydroxy; $R_5$ is a member selected from the group consisting of hydrogen, alkyl, aryl and aralkyl; X is a member selected from the group consisting of hydrogen and fluoro and the bond between the 5- and 6-carbon atoms is selected from the group consisting of a single bond and a double bond.

16. The compounds of the formula

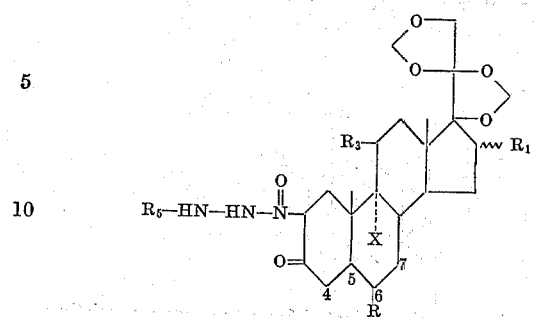

wherein R is a member selected from the group consisting of hydrogen, methyl, chloro and fluoro; $R_1$ is a member selected from the group consisting of hydrogen, α-methyl and β-methyl; $R_3$ is a member selected from the group consisting of hydrogen, keto and β-hydroxy; $R_5$ is a member selected from the group consisting of hydrogen, alkyl, aryl and aralkyl; X is a member selected from the group consisting of hydrogen and fluoro and the bonds between the 4,5- and 6,7-carbon atoms are selected from the group consisting of a single bond and a double bond.

17. The compounds of the formula

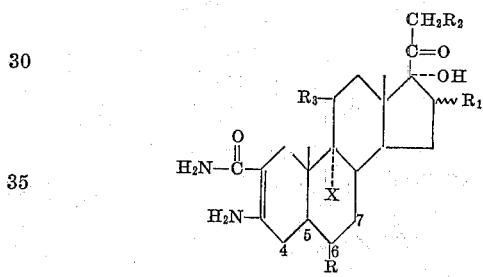

wherein R is a member selected from the group consisting of hydrogen, methyl, chloro and fluoro; $R_1$ is a member selected from the group consisting of hydrogen, α-methyl and β-methyl; $R_2$ is a member selected from the group consisting of hydrogen, hydroxy and acyloxy in which the acyl radical is derived from an aliphatic acid having from 1 to 10 carbon atoms; $R_3$ is a member selected from the group consisting of hydrogen, keto and β-hydroxy; X is a member selected from the group consisting of hydrogen and fluoro and the bonds between the 4,5- and 6,7-carbon atoms are selected from the group consisting of a single bond and a double bond.

18. The compounds of the formula

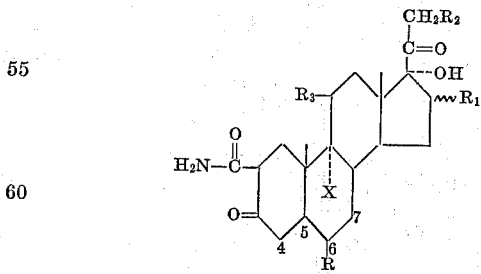

wherein R is a member selected from the group consisting of hydrogen, methyl, chloro and fluoro; $R_1$ is a member selected from the group consisting of hydrogen, α-methyl and β-methyl; $R_2$ is a member selected from the group consisting of hydrogen, hydroxy and acyloxy in which the acyl radical is derived from an aliphatic acid having from 1 to 10 carbon atoms; $R_3$ is a member selected from the group consisting of hydrogen, keto, and β-hydroxy; X is a member selected from the group consisting of hydrogen and fluoro and the bonds between the 4,5- and 6,7- carbon atoms are selected from the group consisting of a single bond and a double bond.

19. The compounds of the formula

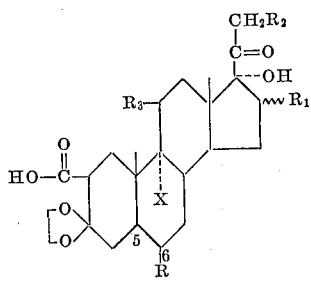

wherein R is a member selected from the group consisting of hydrogen, methyl, chloro and fluoro; $R_1$ is a member selected from the group consisting of hydrogen, α-methyl and β-methyl; $R_2$ is a member selected from the group consisting of hydrogen, hydroxy and acyloxy in which the acyl radical is derived from an aliphatic acid having from 1 to 10 carbon atoms; $R_3$ is a member selected from the group consisting of hydrogen, keto and β-hydroxy; X is a member selected from the group consisting of hydrogen and fluoro and the bond between the 5- and 6- carbon atoms is selected from the group consisting of a single bond and a double bond.

20. The compounds of the formula

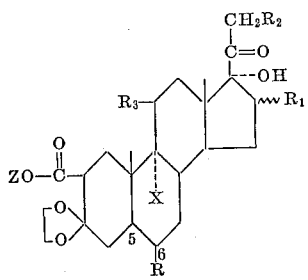

wherein R is a member selected from the group consisting of hydrogen, methyl, chloro and fluoro; $R_1$ is a member selected from the group consisting of hydrogen, α-methyl and β-methyl; $R_2$ is a member selected from the group consisting of hydrogen, hydroxy and acyloxy in which the acyl radical is derived from an aliphatic acid having from 1 to 10 carbon atoms; $R_3$ is a member selected from the group consisting of hydrogen, keto and β-hydroxy; X is a member selected from the group consisting of hydrogen and fluoro; Z is alkyl and the bond between the 5- and 6- carbon atoms is selected from the group consisting of a single bond and a double bond.

21. The compounds of the formula

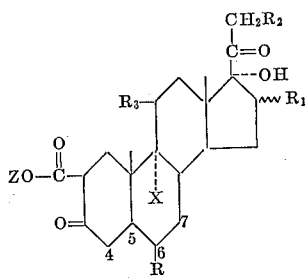

wherein R is a member selected from the group consisting of hydrogen, methyl, chloro and fluoro; $R_1$ is a member selected from the group consisting of hydrogen, α-methyl and β-methyl; $R_2$ is a member selected from the group consisting of hydrogen, hydroxy and acyloxy in which the acyl radical is derived from an aliphatic acid having from 1 to 10 carbon atoms; $R_3$ is a member selected from the group consisting of hydrogen, keto and β-hydroxy; X is a member selected from the group consisting of hydrogen and fluoro; Z is alkyl and the bonds between the 4,5- and 6,7- carbon atoms are selected from the group consisting of a single bond and a double bond.

22. The compounds of the formula

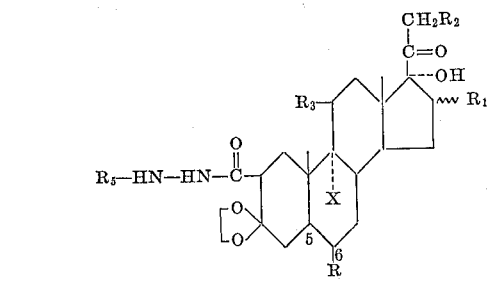

wherein R is a member selected from the group consisting of hydrogen, methyl, chloro and fluoro; $R_1$ is a member selected from the group consisting of hydrogen, α-methyl and β-methyl; $R_2$ is a member selected from the group consisting of hydrogen, hydroxy and acyloxy in which the acyl radical is derived from an aliphatic acid having from 1 to 10 carbon atoms; $R_3$ is a member selected from the group consisting of hydrogen, keto and β-hydroxy; $R_5$ is a member selected from the group consisting of hydrogen, alkyl, aryl and aralkyl; X is a member selected from the group consisting of hydrogen and fluoro and the bonds between the 5- and 6- carbon atoms is selected from the group consisting of a single bond and a double bond.

23. The compounds of the formula

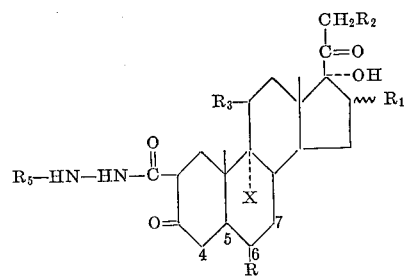

wherein R is a member selected from the group consisting of hydrogen, methyl, chloro and fluoro; $R_1$ is a member selected from the group consisting of hydrogen, α-methyl and β-methyl; $R_2$ is a member selected from the group consisting of hydrogen, hydroxy and acyloxy in which the acyl radical is derived from an aliphatic acid having from 1 to 10 carbon atoms; $R_3$ is a member selected from the group consisting of hydrogen, keto and β-hydroxy; $R_5$ is a member selected from the group consisting of hydrogen, alkyl, aryl and aralkyl; X is a member selected from the group consisting of hydrogen and fluoro and the bonds between the 4,5- and 6,7- carbon atoms are selected from the group consisting of a single bond and a double bond.

References Cited

UNITED STATES PATENTS 3,067,194  12/1962  Tishler et al. _____ 260—239.5
3,148,183   9/1964  Hirschman et al. ___ 260—239.5

OTHER REFERENCES

Kissman et al.: J. Org. Chem., 26, pp. 2610–11, July 1961.

Kissman et al.: J. Org. Chem., 27, pp. 3168–75, September 1962.

LEWIS GOTTS, *Primary Examiner.*

HENRY A. FRENCH, *Assistant Examiner.*